(12) United States Patent
Cowan

(10) Patent No.: US 7,243,337 B1
(45) Date of Patent: *Jul. 10, 2007

(54) MANAGING HARDWARE AND SOFTWARE CONFIGURATION INFORMATION OF SYSTEMS BEING TESTED

(75) Inventor: Kenneth W. Cowan, Hollis, NH (US)

(73) Assignee: Compuware Corporation, Detroit, MI (US)

( * ) Notice: Subject to any disclaimer, the term of this patent is extended or adjusted under 35 U.S.C. 154(b) by 819 days.

This patent is subject to a terminal disclaimer.

(21) Appl. No.: 10/645,093

(22) Filed: Aug. 21, 2003

Related U.S. Application Data

(63) Continuation of application No. 09/548,127, filed on Apr. 12, 2000, now Pat. No. 6,701,519.

(51) Int. Cl.
*G06F 9/44* (2006.01)
(52) U.S. Cl. .................................... 717/127
(58) Field of Classification Search ............ 717/126, 717/127

See application file for complete search history.

(56) References Cited

U.S. PATENT DOCUMENTS

| 5,410,681 | A | * | 4/1995 | Jessen et al. | 703/27 |
| 5,742,754 | A | * | 4/1998 | Tse | 714/38 |
| 5,754,760 | A | * | 5/1998 | Warfield | 714/38 |
| 6,014,760 | A | * | 1/2000 | Silva et al. | 714/46 |
| 6,266,788 | B1 | * | 7/2001 | Othmer et al. | 714/38 |
| 6,279,124 | B1 | * | 8/2001 | Brouwer et al. | 714/38 |
| 6,418,543 | B1 | * | 7/2002 | Goli et al. | 717/125 |

OTHER PUBLICATIONS

"DevCenter Concepts, NuMega™ DevCenter™, Making Software Development Manageable™," Mar. 1999, Compuware Corp., pp. i-x and 1-87.*
Albert Endres, "An Analysis of Errors and Their Causes in System Programs," Proceedings of the International Conference on Reliable Software, Los Angeles, California, 1975, ACM Press, pp. 327-336.*
IBM Technical Disclosure Bulletin, vol. 32, issue 6B, pp. 467-469 (1989) (4 printed pages).*
Cem Kaner, et al., "Testing Computer Software," International Thomson Computer Press, 1993, pp. i, ii, 143-167.*

* cited by examiner

*Primary Examiner*—Tuan Dam
*Assistant Examiner*—Eric B. Kiss
(74) *Attorney, Agent, or Firm*—Muirhead & Saturnelli, LLC

(57) ABSTRACT

Techniques for gathering platform information are described. The platform information describes the environment in which a program executes. The platform information includes software component information and system configuration information uniquely identifying a particular instance of an environment. This information is stored collectively in the database over a period of time. This data is then analyzed and available for performing queries for example such as regarding test coverage and may be used to reproduce software faults.

37 Claims, 20 Drawing Sheets

MANAGING HARDWARE AND SOFTWARE CONFIGURATION INFORMATION OF SYSTEMS BEING TESTED

CROSS REFERENCE TO RELATED APPLICATIONS

This application is a continuation of U.S. patent application Ser. No. 09/548,127 filed on Apr. 12, 2000 now U.S. Pat. No. 6,701,519.

BACKGROUND

1. Field of the Invention

This invention generally relates to software project management, and more particularly to techniques performed in a computer system for managing configuration data for platforms being tested.

2. Description of Related Art

Generally, software testing is part of the software development process. Software testing may be performed, for example, to test a code modification that adds a new feature or corrects a reported problem. Software systems may rely on software components that are external to the software system, such as a software component provided as part of an operating system as well as various third-party provided software components. Various versions of the same software component may be tested as code is incrementally modified. Additionally, software testing may include execution of a software system on a variety of different hardware configurations and system configurations to ensure proper performance. Together, the hardware configurations, and software components and settings describing an environment in which a particular software system is tested may be referred to as a "platform". As an integral part of software testing, it is important to ensure that software systems are tested on a variety of different platforms, for example, with different hardware and software combinations.

One problem in software testing is keeping track of the different hardware and software combinations that are included in a particular platform describing the environment in which a version of a software system is tested. Additionally, when a software fault occurs, for example on a customer system, the difference between the customer's platform and a tested platform may be crucial for reproducing the fault as experienced on the customer system. Obtaining details of the platform configuration of the customer system as well as the various systems tested by developers may be manually tedious and error prone. Additionally, each time there is even a slight change in the platform used in testing, a new inventory of the hardware and software options and settings must be taken and recorded as this constitutes an additional platform.

The problem of tracking different platform configurations is further compounded by indirect dependencies between components. For example, the software system under development might rely on a component A which in turn relies on a component B which in turn also further relies on another component C. Thus, in tracking dependencies and information with regard to a particular platform, the software system being tested is dependent upon a particular version of components A, B and C. The fact that the software system being tested has an indirect dependency upon the C component may not be obvious to developer of the software, for example, as it may be an indirect call to a library provided in an operating system. Thus, tracking software related platform options may be further complicated by these indirect dependencies.

One technique currently in use is to manually track data describing the various platforms. However, as previously described, one of the drawbacks of this technique stems from the tediousness of tracking even the slightest change with a particular platform. The data gathering may be time consuming as well as error prone. Also, as previously pointed out, another drawback is that it may be difficult to identify all of the indirect dependencies, for example as the previously described software component C. Additionally, the problem may be further compounded in terms of complexity and environment in which shared components such as a shared library may be updated from one of a variety of software package installations. For example, two layered software products may use the same software library. When each of the two layered products are installed, a different version of the same library may be installed on the same computer system. It may be unclear to one using a routine in the library which version is being used. Thus, such installations using shared software components make it difficult and further compound the problem of tracking the various software components associated with a particular platform.

Thus, there is required a technique which provides for automatically tracking the various hardware and software components of a particular platform in accordance with a particular version of a software system being tested.

SUMMARY OF THE INVENTION

In accordance with principles of the invention is a method executed in a computer system for automatically tracking platform usage. One or more records of platform information are recorded for a plurality of program executions. Each of the one or more records of platform information corresponds to one of the plurality of program executions. Data relating to the one or more records of platform information are summarized to assess the effectiveness of platform usage.

In accordance with another aspect of the invention is a method executed in a computer system for automatically tracking platform coverage. One or more records of platform information for a plurality of program executions are recorded. Each of the one or more records of platform information corresponds to one of the plurality of program executions. Data relating to the one or more records of platform information is summarized to assess the effectiveness of platform coverage.

In accordance with yet another aspect of the invention is a computer program product for tracking platform usage. Machine executable code is included for recording one or more records of platform information for a plurality of program executions. Each of the one or more records of platform information corresponds to one or the plurality of program executions. Machine executable code is also included for summarizing data related to the one or more records of platform information to assess platform usage.

In accordance with yet another aspect of the invention is a computer program product for automatically tracking platform coverage. Included is machine executable code for recording one or more records of platform information for a plurality of program executions. Each of the one or more records of platform information corresponds to one of the plurality of program executions. Also included is machine executable code for summarizing data related to the one or more records of platform information to assess the effectiveness of platform coverage.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF PREFERRED EMBODIMENT

Figure 1:
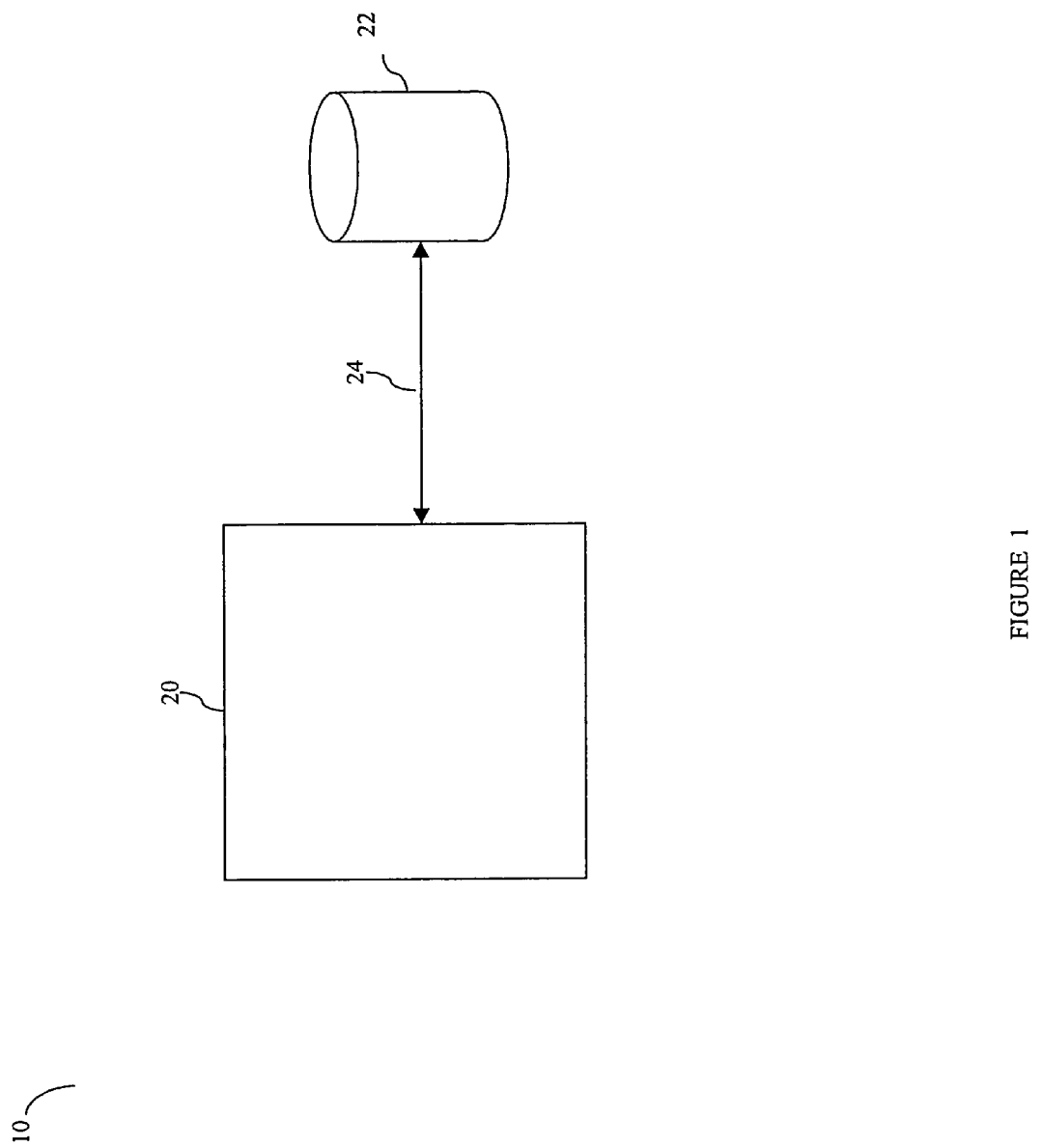
FIG. 1 is an example of an embodiment of a computer system.

Referring to FIG. 1, shown is an example of an embodiment of a computer system. The computer system 10 includes a computer processor 20 connected to a data storage device 22 by communication means 24. In the computer system 10, the computer processor 20 may be any one of a variety of commercially available processors, such as an INTEL® processor. It should be noted that other computer processors may be used in an embodiment and neither the type nor number of processors should be construed as a limitation.

The computer processor 20 is connected by a communication means 24 to a data storage device 22. The data storage device 22, for example may be any one of a variety of data storage devices known to those skilled in the art. The data storage device 22 may include a database and comprise a varying number and type of storage devices ranging from, for example, a plurality of disks to a single "floppy" drive.

As known those skilled in the art, both the processor and the data storage device may vary in accordance with each embodiment and implementation in terms of number and type of each. Similarly, the communication means 24 used to facilitate communications between the processor 20 and the data storage device 22 may be any one of a variety of communication devices, such as a network connection in accordance with each implementation and embodiment.

Figure 2:
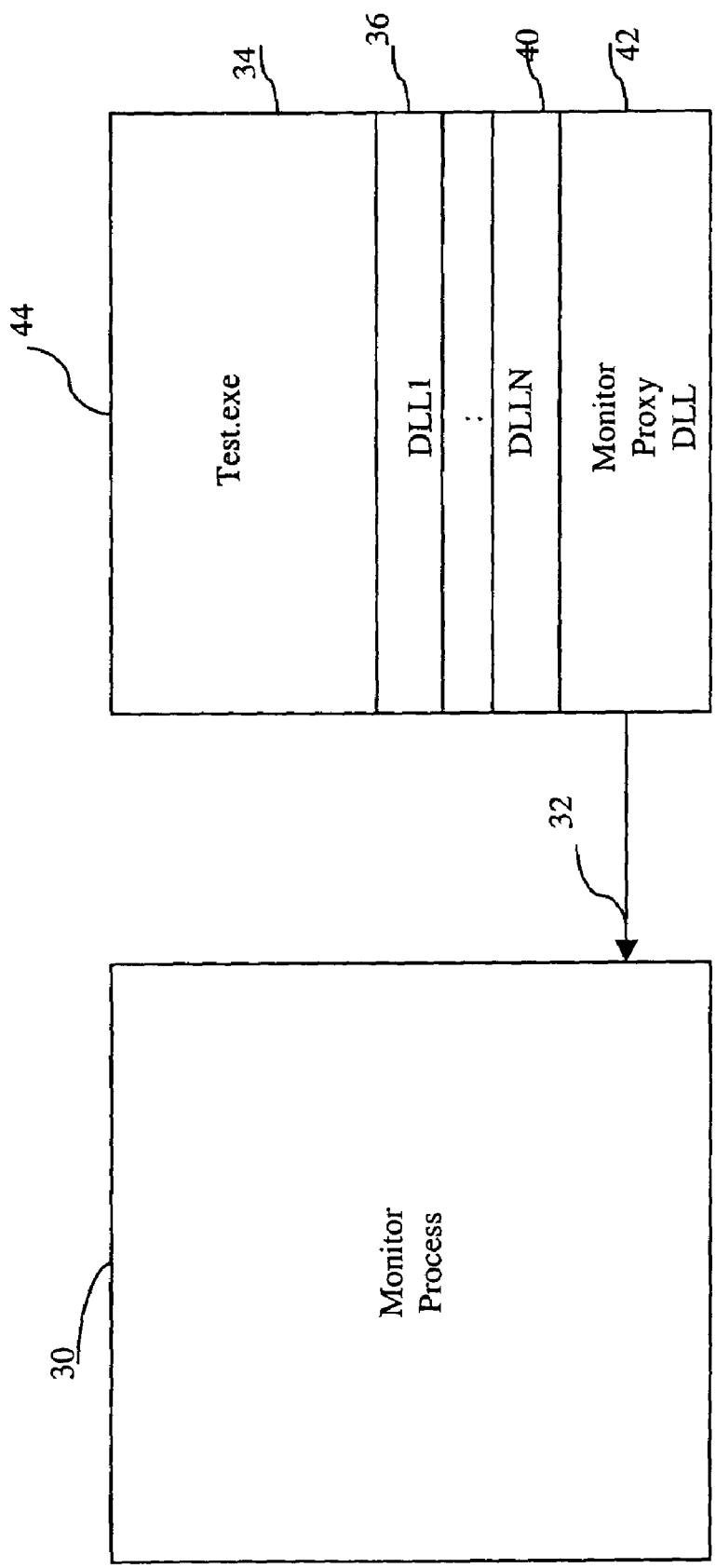
FIG. 2 is an example of an embodiment of a monitor process gathering information from a test program.
Figure 3:
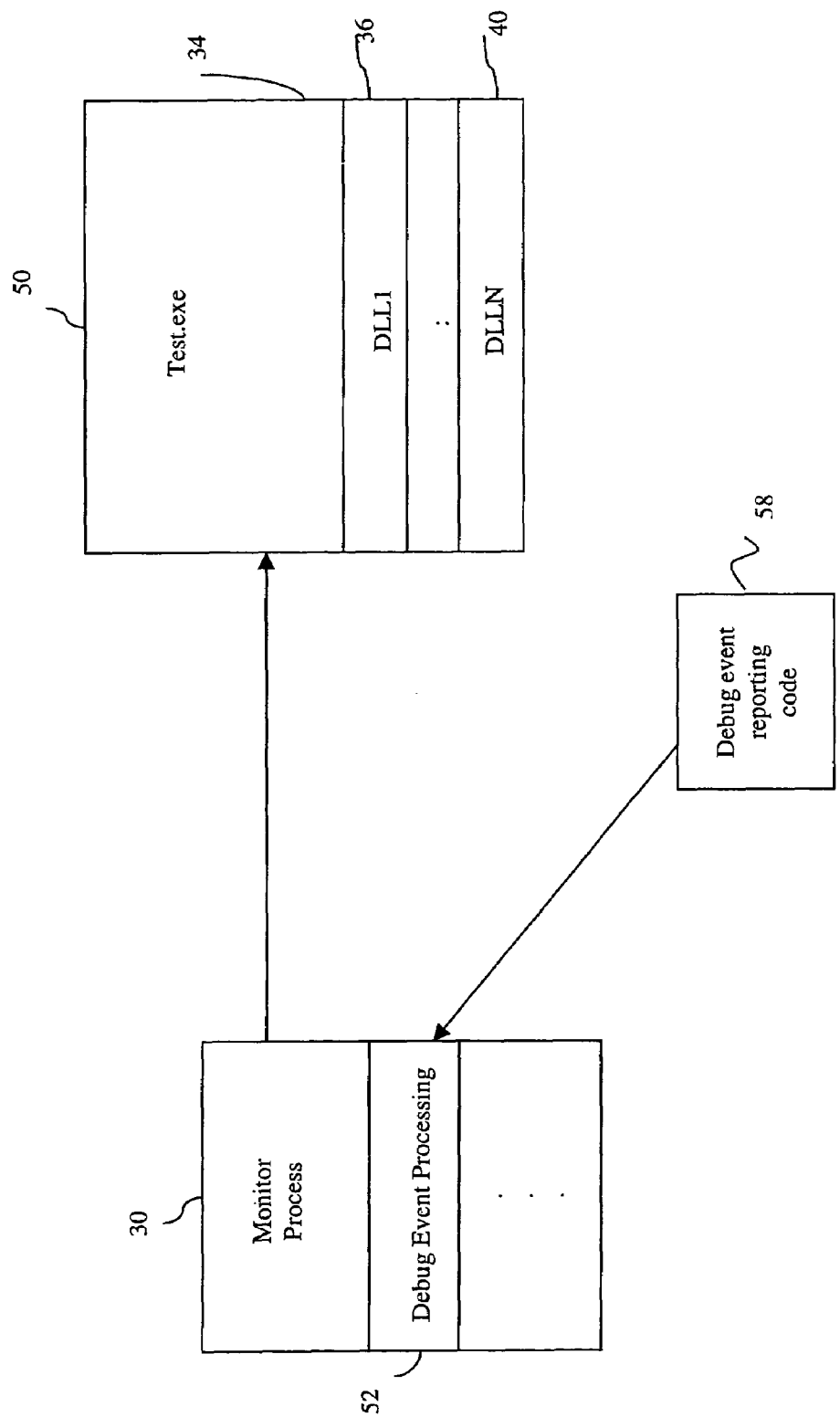
FIG. 3 is an example of another embodiment of a monitor process gathering information from a machine executable program.

What will now be described in conjunction with FIG. 2 and FIG. 3 are embodiments that may be used to gather a portion of platform data. Platform data generally includes system configuration information and software data that describes a software programming environment. The software data includes software component information distinguishing one version of a software component from another. The system configuration data may include, for example, different software settings or options and hardware data particular to a system environment. The hardware data may include, for example, hardware configuration data distinguishing the system upon which a program is executed. Taken together, the system configuration data and software data describe a "platform" as may describe the environment in which a program is executed.

Referring now to FIG. 2, shown is an example of an embodiment of software that may execute in the computer system 10. FIG. 2 includes a monitor process 30 and a program being monitored 44. Both the monitor process 30 and the machine executable program being monitored (test.exe 44) may be executed by the computer processor 20 and stored on the data storage device 22. The machine executable code associated with the monitor process 30 and the program being tested 44, for example, may be stored on the data storage device 22 in the computer system 10 and loaded for execution via communication means 24 to the computer processor 20.

The monitor process 30 may be a machine executable program written in any one of a variety of commercially available programming languages, such as C++. An example of a monitor process is included in the commercially available implementation of NUMEGA™ BOUNDSCHECKER™. Generally, the monitor process 30 gathers information and data in accordance with the execution of the program under test 44 which in this example may be referred to as test.exe. The machine executable program 44 being monitored in this particular example may be written in one of a variety of conventional, commercially available languages, such as C, and C++, for which instrumentation may be provided. One technique of how instrumentation of a program may be performed is described in U.S. patent application Ser. No. 08/916,125, now issued U.S. Pat. No. 5,987,249, entitled "IR Code Instrumentation".

The illustration in FIG. 2 of the program being monitored, test.exe 44, includes several portions. The portion 34 corresponds to a segment of user supplied source code. Also included in the program 44 are several dynamic link libraries (DLLs). Each of the DLLs, for example such as DLL1 36 and monitor proxy DLL 42, correspond to shared machine executable code which resides in the computer system 10 as a library of routines which may be used, for example, by the user supplied portion 34. Additionally, a DLL, such as DLLN 40, may be included due to an indirect call from within another DLL, such as DLL1 36. This may occur, for example, if a call is made by DLL1 36 to an operating system or other routine which is included in another DLL. As previously described, a call may also be made to a DLL directly from the user portion 34.

It should be noted that the monitor proxy DLL 42 may be included automatically at link time into the machine executable 44 in this particular embodiment as a result of code instrumentation. Alternatively, other embodiments may employ other techniques to cause DLL 42 to be loaded into process execution space, for example, as described in "Programming Applications for MICROSOFT® WINDOWS®", 4th Edition, by J. Richter, Microsoft Press, September 1999. In this particular embodiment, the monitor proxy DLL 42 is included in the commercially available product NUMEGA™ TRUE TIME™ in conjunction with the monitor process 30, for example, using the techniques set forth in U.S. patent application Ser. No. 08/916,125, now issued U.S. Pat. No. 5,987,249, entitled "IR Code Instrumentation". Generally, the monitor proxy DLL 42 includes monitoring routines which report information back to the monitor process 30. In this particular embodiment, the monitor proxy DLL 42 includes code that monitors events related to the loading of various types of libraries. For example, the libraries monitored by routines in the monitor proxy DLL 42 include shared libraries or DLLs as well as OCX or ACTIVEX® Control libraries. Generally, as known to those skilled in the art, DLLs and OCXs include shareable machine executable code that may be used for example by program 44. The proxy monitor DLL 42 includes routines that send load event information to the monitor program 30 using connection 32.

In this embodiment, the monitor proxy DLL 42 may receive DLL load information by scanning the process virtual address space, or, by monitoring calls to operating system routines that load the DLLs, such as the LoadLibrary routine from MICROSOFT® WINDOWS®. Information may be transferred to the monitor 30 using shared memory as the communication channel 32. It should be noted that other embodiments may employ other techniques in accordance with each implementation.

The library load information communicated from the monitor proxy DLL 42 to the monitor process 30 may be achieved, for example, in a WINDOWS® programming environment, such as using WINDOWS® 95 or WINDOWS® NT. In this environment, programming applications may be invoked from a menu option. For example, using a "start" option selected from a menu display, the machine executable program 44 may be selected to begin execution. Once the program 44 to be tested or monitored is executed, the monitor process 30 is invoked indirectly from code included in the monitor proxy DLL. The monitor process 30 is invoked indirectly because previously the machine executable program 44 was linked for instrumentation and monitoring.

The monitor proxy DLL 42 monitors operating system events for loading machine executable code or libraries such as DLL1 36 and DLLN 40. The monitor proxy DLL 42 includes code to accomplish this, for example, by monitoring user API calls made within the user supplied portion 34. For example, the monitor proxy DLL may monitor specific user APIs such as CoCreateInstance and Load Library which are APIs used in the WINDOWS® environment for loading DLLs. It should be noted that other embodiments may include monitoring of other particular APIs from within user code 34. Additionally, other techniques may be used to gather information regarding software components used with a program being tested 44.

It should be noted that the foregoing description regarding FIG. 2 refers to one technique by which data regarding software components used by a particular program being tested may be communicated to a monitor process for gathering of software component information whose use will be described in the following paragraphs.

Referring to FIG. 3, shown is an example of another embodiment by which information may be gathered regarding particular operating system events as needed for loading different software components or libraries. In FIG. 3, shown is the monitor process 30 a machine executable program to be tested 50 and debug event reporting code 58. The debug event reporting code 58 may be a portion of operating system code that is invoked when a particular system event occurs. In this particular embodiment, the program being tested 50 does not include a monitor proxy DLL 42 as previously shown in the embodiment of FIG. 2. Additionally, it should be noted that the program 50 may also be written in any one of a variety of commercially available programming languages, such as C or C++.

In this particular embodiment, the debug event reporting code 58 forwards information regarding operating system events for loading different libraries such as DLL 1 36 to a portion of code referred to as debug event processing code 52 included in the monitor process 30.

The alternate embodiment as depicted in FIG. 3 may occur, for example, by invoking the monitor process directly from the "start" program menu as in a WINDOWS® 95 or other similar programming environment. Subsequently, from within the monitor process 30, a command or graphical user interface may be displayed and the user may enter commands to invoke the machine executable program to be tested 50.

When program 50 is executed, the debug event reporting code 58 monitors or "catches" certain operating system events, such as the loading of libraries such as DLL1 36. In this embodiment, the operating system includes code for loading the library, such as DLL1. The operating system also includes the code associated with the debug event reporting code 58. Thus, in this embodiment, the operating system transfers control from the load library routine to the debug event reporting code 58, for example, upon loading a DLL. Subsequently, when a DLL load event occurs, the debug event reporting code 58 is executed and reports the occurrences of the load event to the debug event processing code 52 of the monitor process 30. In one particular embodiment, the debug event processing code 52 includes a code loop which continuously monitors events from the WIN32 API as reported by the debug event reporting code 58.

In one embodiment, the communication channel between the debug event reporting code 58 and the debug event processing code 52 may be established by having monitor process 30 identified or associated with the program 50 as a debugger process, such as by using operating system routines. Other embodiments may employ other techniques in accordance with each implementation.

It should be noted that the embodiments previously described with regard to FIGS. 2 and 3 are two of a variety of different techniques that may be used to gather various software component information. In this particular embodiment the software components for which information is being gathered are libraries, such as DLLs or OCXs as known in the WINDOWS® environments. Other types of programming environments may include different types of software components other than a library such as a DLL or OCX.

The types of software components that may be used in connection with testing a software program may vary with programming environment. However, generally a software component is a unit of software that may be used with a machine executable program, such as 50 of FIGS. 3 and 44 of FIG. 2. In other words, each of the software components are units that may be varied within a machine executable program to be tested. Using these monitoring techniques, data regarding the different software components is gathered.

In the previously described embodiment of FIG. 2, the monitor proxy DLL 42 is included as a portion of the program being tested 44 to monitor for specific calls and communicate information to the monitor process 30 when a particular software component is loaded. This DLL 42 is automatically included in the linked program 44 as a result of instrumentation of the program. In this embodiment, for example, DLL 42 may be included in a commercially available product such as NUMEGA™ TRUE TIME™. The technique of FIG. 2 may be used with a program that uses code instrumentation. For example, the program 44 may be an instrumented machine executable program produced using C source code.

In contrast, the embodiment in FIG. 3 uses debug event reporting code 58, such as operating system code invoked for debug event processing, that forwards data to the monitor process when a particular software component is loaded. No instrumentation is used and no monitor proxy DLL 42 is included in the resulting program being tested 50.

Using either technique in FIG. 2 or FIG. 3, information regarding the software component used is communicated to the monitor process 30. Generally, the information which is recorded for the particular library or software component is distinguishing information enabling one to identify a particular version of the software component or library. This information may include, for example a version number, a link date and time, a file size, as well as other information which may be used to distinguish one version of the software component from another.

What has been described generally is the gathering of information with regard to software components. In the previously described embodiments, the software components included libraries such as DLLs or OCXs. The information which is gathered with regard to each of the libraries is distinguishing or identifying information to enable one particular version of a software component to be distinguished from another version of the software component. What will now be described is how this information may be stored and used within the system 10, as well as a particular embodiment of the information in accordance with a database schema.

Figure 4:
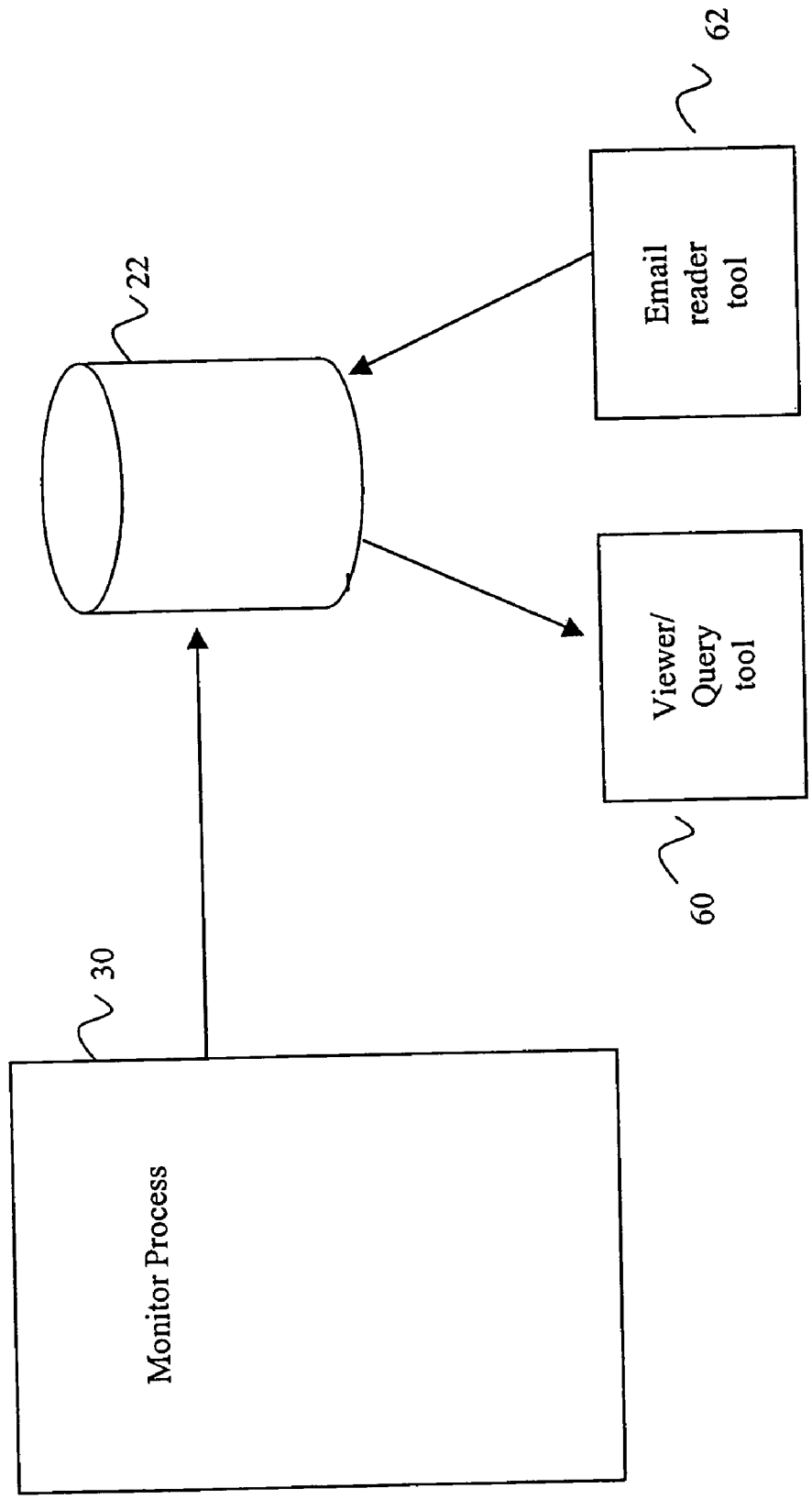
FIG. 4 is an example of an embodiment of a monitor process interacting with a database and other tools using information stored to the database.

Referring to FIG. 4, shown is a data flow diagram of one embodiment of the data flow relationship between the monitor process and various tools using software component information. The monitor process 30 and the e-mail reader tool 62 in this particular embodiment store the information gathered regarding the libraries on the storage device 22. This information may be used by various tools such as a viewer/query tool 60.

It should be noted that other embodiments may include other tools using the information in device 22. Additionally, other information besides the software component and other platform data may reside on the storage device 22.

Generally, platform data includes the software component information gathered by the monitor process. The platform data is stored in the data storage device 22 in any one of a variety of data organizations and formats that may be understood and accessed by the various tools, such as the viewer/query tool 60 and the e-mail tool 62. In one embodiment, the viewer/query tool 60 accesses platform information and, via a user interface, displays the information in a user-readable form.

The e-mail reader tool 62 may be connected to an outside network and is forwarded formatted e-mail messages, for example, from a customer site reporting a problem. The formatted e-mail message may describe the platform upon which the problem occurs. The e-mail reader may interpret this formatted e-mail message and enter associated platform data in the database for the bug report.

It should be noted that the formatted e-mail message may be in any one of a variety of fixed formats. For example, in one embodiment, the e-mail message includes one or more pairs of data. Each pair includes a field-name and one or more corresponding data fields. The field-name is recognized as a keyword by the e-mail reader tool and the keyword and corresponding data map to fields and corresponding data values as may be used in a database organization. For example, a field-name, may refer to a particular type of database object having one or more associated fields. The corresponding data may identify a particular field of the object and a value for an instance of that field. Other embodiments may have other types of formatted input that the tool understands and subsequently maps to a corresponding database item.

Tools, such as the viewer query tool 60 and e-mail reader tool 62, may be bundled with the commercially available monitor process 30. Alternatively, each of the software tools may also be additional third party products that interact with data in a particular format for example as will be described in a particular database format. It should also be noted that other tools and other functions in accordance to the particular embodiment may exist and interact with the data storage device 22 making use of software component information as gathered by the monitor process 30.

In one embodiment, the platform data on the data storage device 22 is stored in a particular database format known as an object-oriented database, such as that used with the commercially available object-oriented database POET, by POET SOFTWARE. In this particular implementation, the data which is gathered by the monitor process 30 is stored in an object database in which the data is represented in the form of objects that are connected or associated with one another. The data is stored on the storage device 22 and the various tools such as the viewer/query tool 60 and the e-mail reader tool 62 interact with this commercially available database, for example, using a query language and interface provided with the commercially available database product. For example, APIs as provided by the commercially available object database software may be used to formulate a query and obtain data resulting from a query.

Figure 5:
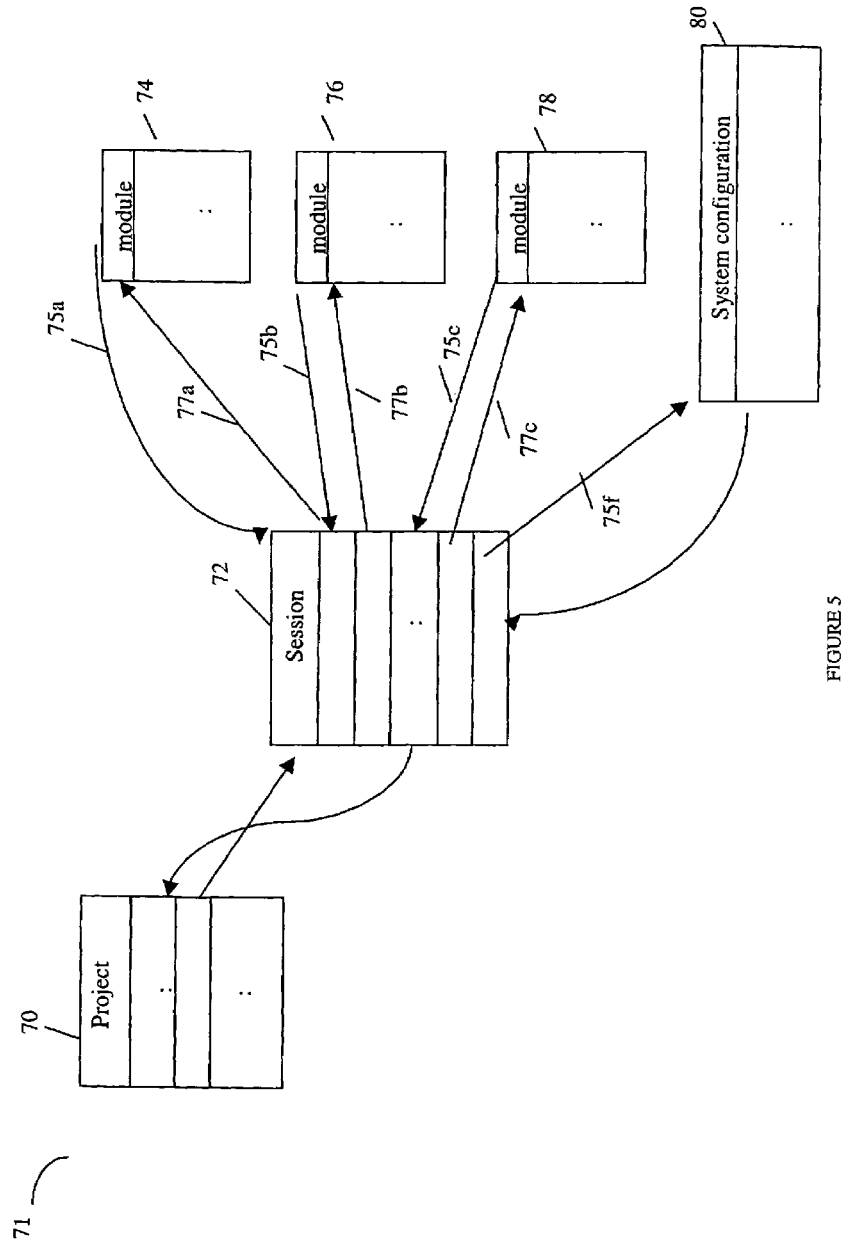
FIG. 5 is an example of an embodiment of a data representation of information stored in the database of FIG. 4.

Referring to FIG. 5, shown is an example of a representation of a database schema 71 describing a database organization. In accordance with the representation 71, the various types of software component information as gathered by the monitor process 30 may be stored on the device 22. It should be noted that although what will be described is stored in a particular type of database and a particular representation of the data, other embodiments may use other types of databases and other representations for storing the platform data gathered by the monitor process 30. Included in the representation of the database schema is a project object 70, a session object 72, module objects 74, 76 and 78, and system configuration object 80. Relationships stored in the database between these various objects are represented by the arrows, for example, such as 75a, 75b and 75c.

In this particular instance shown in FIG. 5, a project object 70 points to a particular session object 72. Generally, the project object represents information about a particular software project, for example, a particular software product under development. The session object 72 generally describes a particular test run or execution. The various fields represented within the session object 72 identify different hardware and software data and settings particular to the session instance being tested or identified by the object 72. Generally, a platform is referred to as various combinations of hardware and software data and settings. In this particular description, platform data includes software component information such as may be communicated by the monitor process 30, as well as system configuration information 80. All of this information such as the software component information and the system configuration information is described in more paragraphs that follow.

Generally, the objects and the relationships between the objects as stored in accordance with the model 71 are dictated by the various types of operations in queries to be performed upon the data stored in the device 22 as gathered by the monitor process 30. In this particular embodiment, each of the module objects such as 74, 76 and 78 identify software component specific information. For example, in the database representation 71, a module corresponds to a particular library, such as a DLL. Recorded within each of the module objects such as 74 is software component information which uniquely identifies a particular version of a DLL for example. Similarly, the system configuration object 80 identifies various hardware configuration items and software environment conditions that may be referred to as system configuration items that were tested with regard to a particular session or test execution 72.

From the representation in FIG. 5, given a particular session, the different software and hardware information particular to that test execution may be obtained. Similarly, given a particular module object, it may be determined what test runs or sessions included or tested that particular software component. This is shown for example by the arrow 75a from the module 74 to the session object 72. Generally, in this embodiment, there are double pointers between each pair of project and session objects, system configuration and session objects, and components and session objects.

It should be noted that although FIG. 5 shows only a single session, in the database stored on the device 22 a plurality of sessions may be stored in which multiple sessions may point to the same instance of a module object. In turn, that single module object may have multiple arrows such as 75a from the module to the various sessions which utilize that particular software component. It should be noted that the same relationships may exist between one or more session objects and a system configuration object included in the representation 71.

Generally, although the representation 71 of FIG. 5 includes only a particular number of various types of objects, it should be noted that this is a "snapshot" of one state of the database. Other embodiments may have a varying number of objects and associations, for example, in accordance with the number of modules, and the like represented in the database.

Figure 6:
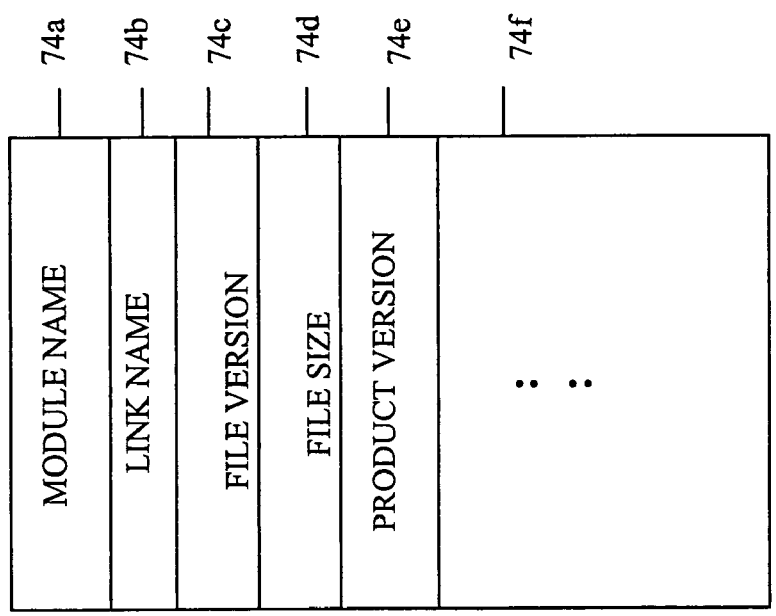
FIG. 6 is an example of the module object as included in the database schema.

Referring to FIG. 6, shown is an example of an embodiment of the module object 74. It should be noted that although what is shown are the details of only a single module object 74, these field that will be described may also be included in other modules objects, such as 76, included in the representation 71. In this particular embodiment, the module object includes information which identifies uniquely a particular version of a shared library. Included in module object 74 is a module name 74a, a link date 74b, a file version 74c, a file size 74d, a product version 74e, and additional fields denoted by 74f. In this particular instance, a module name 74a may be an alpha-numeric or other representation identifying the software component. Additionally, the link date 74b may includes a date format record indicating, for example, the month, day, year, and time in terms of hours, minutes and seconds, of a particular linking of the module. In file version field 74c, a string, for example, may be stored as "4.3", identifying a particular release of a module. The file size is indicated in field 74d. This may be, for example, a numeric quantity representing the size of the module in bytes. The product version field 74e may also be a string that similarly identifies a version of an associated product, for example, that includes or uses the module identified by the object. Additional information may be stored also in this module record as indicated by 74f, for example, such as pointer to one or more session objects that include this module like that indicated by arrow 75a from FIG. 5.

Figure 7:
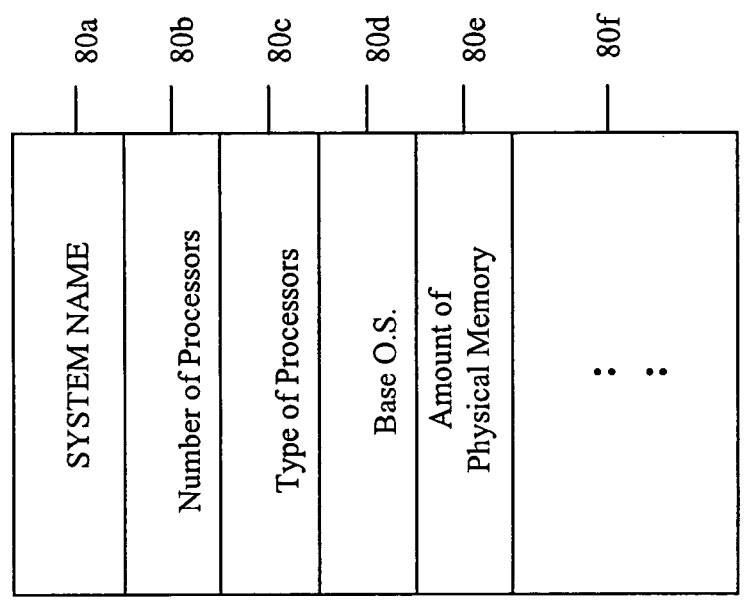
FIG. 7 is an example of an embodiment of the system configuration information object that may be included in the representation of a database schema.

Referring now to FIG. 7, shown is an example of an embodiment of the system configuration object 80. In this particular embodiment, the system configuration object includes fields which identify and describe a particular system environment, for example, including hardware configuration information as well as various software environment settings defining a particular platform. The representation 80 includes fields system name 80a, number of processors 80b, type of processors 80c, base operating system 80d, amount of physical memory 80e, and other system configuration information fields indicated by 80f. For example, a system name is indicated field 80a which may indicate a particular alpha-numeric name identifying a processor or node within a network upon which various test execution runs may occur. Also indicated in the number of processors field 80b may be a numeric quantity representing the number of processors that are in the system corresponding to system name and field 80a. Field 80c may indicate the type of each processor that occurs in the system name identified by 80a. Field 80d may be a base operating system indicator of a particular type and/or version number of an operating system. Field 80e may be a numeric quantity representing the amount of physical memory available in system 80a. It should also be noted that additional information may be included in accordance with each particular embodiment as indicated by 80f of FIG. 7. This information may include, for example, display resolution, indicator as to the number of colors (i.e., 256, 65536, 24-bit color, and the like), number of monitors, country information, language information, indicators as to whether various hardware and system support is available or set regarding, for example, double byte character set or whether Middle Eastern support (i.e., support for Hebrew and Arabic) is enabled, number of mouse buttons. Additionally, there may be pointer information, such as an indicator as to the associated one or more sessions such as indicated by arrow 75d of FIG. 5.

Figure 8A:
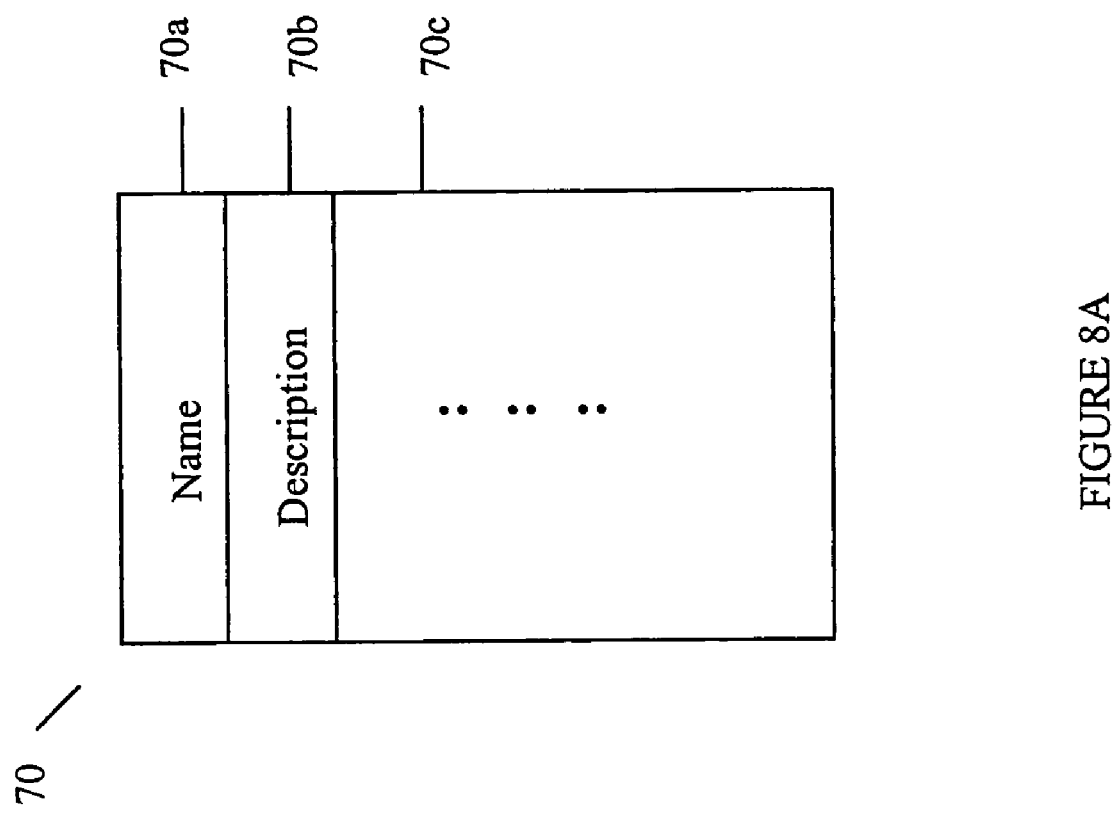
FIG. 8A is an example of an embodiment of the project object that may be included in the representation of the database schema.

Referring to FIG. 8A, shown is an example of an embodiment of a project object 70. This embodiment of the project object 70 includes a name field 70a, a description field 70b, and other fields indicated by 70c. The name field 70a may be a string or other identifier associated with a project name.

The description field 70b may be an alphanumeric description of the project. The other fields indicated by 70c may include, for example, pointer information to other objects such as a pointer to the session object 72 as indicated in FIG. 5.

Figure 8B:
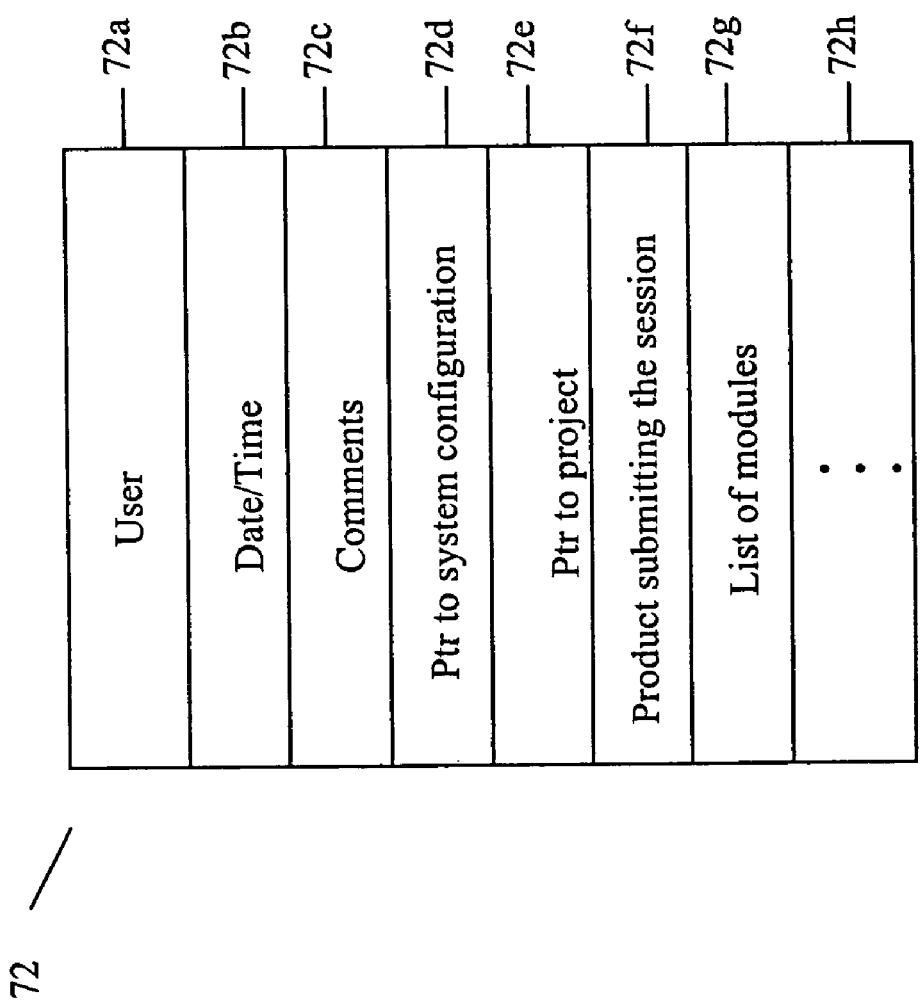
FIG. 8B is an example of an embodiment of the session object that may be included in the representation of the database schema.

Referring to FIG. 8B, shown is an example of an embodiment of a session object. The session object 72 in this example includes a user field 72a, a date/time field 72b, a comment field 72c, a pointer to the system configuration 72d, a pointer to the project 72e, an identifier as to the product submitting the session 72f, a list of components included in this session 72g, and other information as indicated by field 72h. The user field 72a identifies a particular user-identifier, such as a login identifier of a user. This may be represented, for example, as an alpha-numeric string. The date/time field 72b is a date/time stamp information as to when the session occurred.

This may be stored, for example, as an alpha-numeric string. The comments. 72c may be a text field describing the particular session, for example, "test run for bug correction number nnn". Field 72d is a pointer to the associated system configuration object, such as indicated by arrow 75f of FIG. 5. Field 72e is a pointer to the project object, such as indicated by arrow 75e of FIG. 5. Field 72f is an indicator as to the product submitting the session. In this embodiment, this field indicates which monitor product in the commercially available product suite, such as NUMEGA™ DEVPARTNER STUDIO™, the identified user 72a was running. Field 72g is a list of modules associated with this session. For example, this list of associated modules may be represented as arrows 77a, 77b, and 77c of FIG. 5. Field 72h may include other information related to the session being represented in a particular embodiment.

Figure 8C:
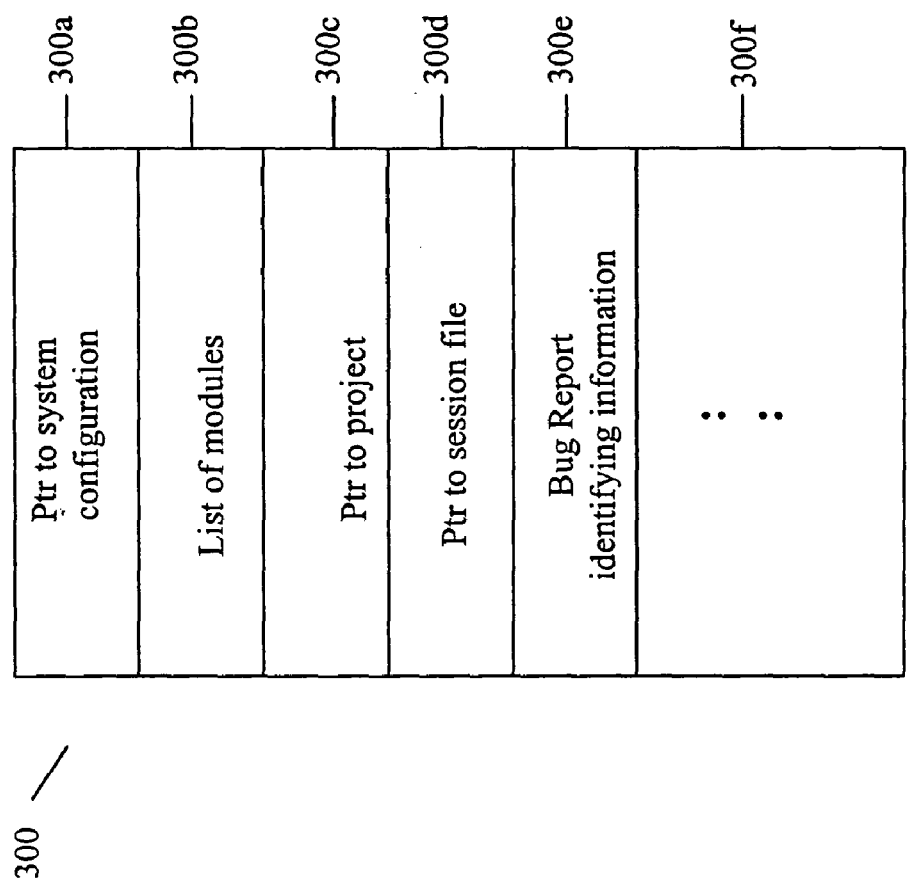
FIG. 8C is an example of an embodiment of a bug report object that may be included in the representation of the database schema.

Referring to FIG. 8C, shown is an example of an embodiment of a bug report object that may be included in the previously described representation of the database schema 71. The bug report object 300 in this embodiment includes a pointer to a system configuration object 300a, a list of modules 300b, a pointer to a project object 300c, a pointer to a session file 300d, bug report identifying information 300e, and other bug report data 300f. This object may be created, for example, in conjunction with a bug report submitted to the e-mail reader tool 62, and included in the database. It should be noted that the fields 300a–300c refer to objects previously described. Data associated with this object may be retrieved and used, for example, as will be described in paragraphs that follow, when querying the database regarding a version of a software module associated with a bug report. The pointer to a session file 300d identifies a corresponding data file related to the bug report, for example, a data file related to test coverage data as may be generated by a testing tool such as NUMEGA™ TRUE TIME™ or NUMEGA™ TRUE COVERAGE™. The bug report identifying information 300e may be one or more fields of data identifying the reported bug. For example, this information 300e may include data such as a priority, who entered the bug report, the date of bug report submission, a description of the problem, product information associated with the reported bug, and the like. It should be noted that, as with other data representations described herein, the fields included may vary in accordance with each implementation.

Figure 9:
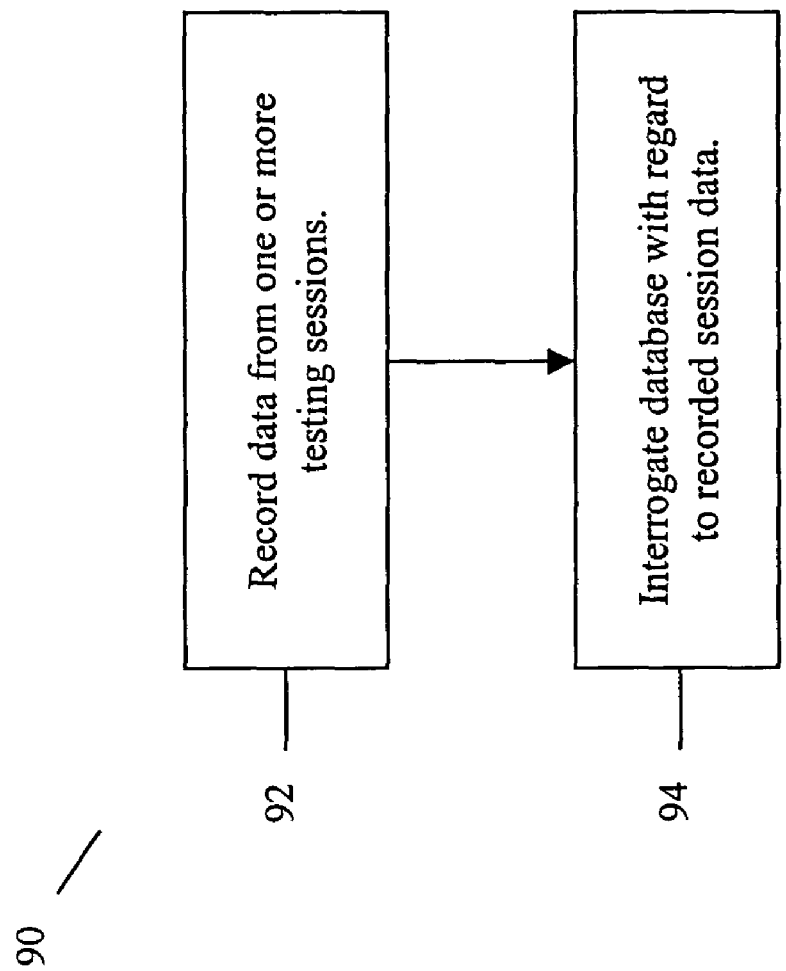
FIG. 9 is a flowchart of an example of an embodiment of how testing data is recorded and used by the monitor process tool.

Referring to FIG. 9, shown is a flowchart of an example of an embodiment of the steps of how software and hardware component and environment information may be stored and used within the system 10. At step 92, one or more sets of platform data, each corresponding to a testing session or execution run, is recorded. At step 94, the database may be interrogated with regard to the recorded session data.

Figure 10:
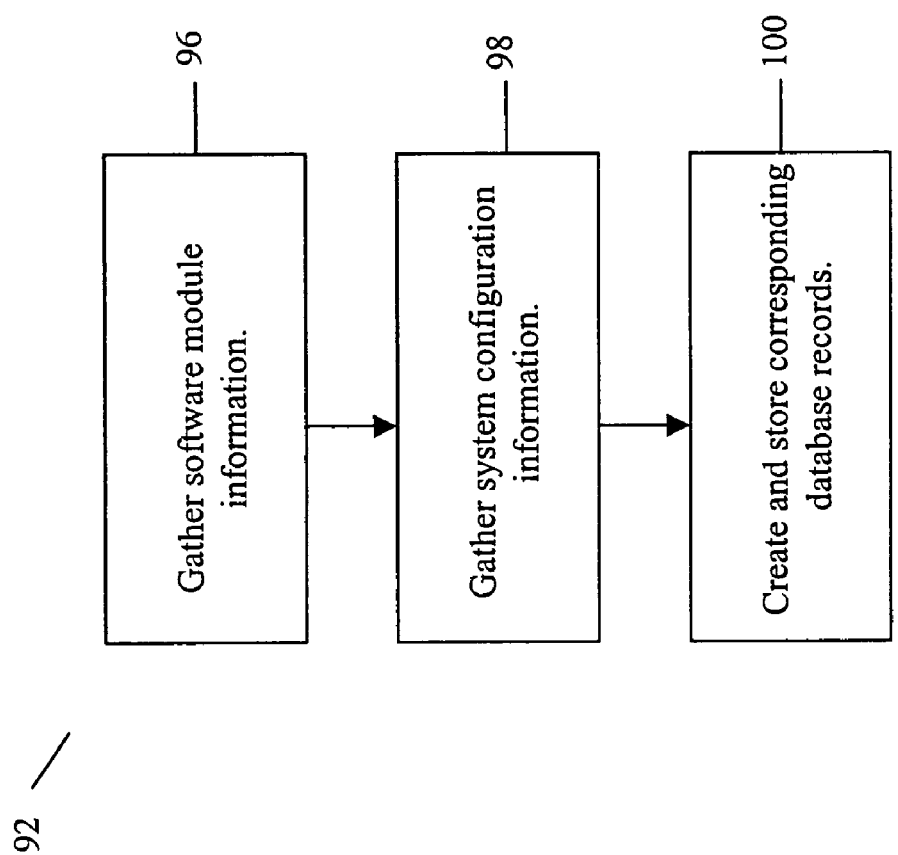
FIG. 10 is a flowchart of an example of embodiment of a method of how data is gathered for one or more testing sessions.

Referring to FIG. 10, shown are more detailed steps of one embodiment for recording platform data describing each testing session environment. At step 96, software module information is gathered. In this particular embodiment software module information is stored in accordance with the previously described database representation 71 using the module object such as 74. In this embodiment, each of the software modules represented by a module object such as 74 corresponds to a library such as DLL or OCX including shared code. The type of information gathered as represented by the module object uniquely identifies a particular version of each of these libraries. It should be noted that gathering software information portion of a set of platform data may be obtained using the foregoing data gathering techniques of a monitor process. Additionally, software information may also be gathered using alternative techniques, such as using operating system calls that return software information as related to a platform.

At step 98, system configuration information is gathered. It should be noted that in this particular embodiment the system configuration information includes data as represented and stored in the system configuration object in accordance with the data representation 71. The system configuration information generally includes data which uniquely identifies a particular system configuration. For example, the system configuration information gathered in step 98 may include a portion of the information as may correspond to, for example, WINDOWS® registry settings.

The system configuration information may be gathered using a variety of different techniques in accordance with each particular embodiment. In one embodiment, system configuration information such as operating system version and number and type of processors may be obtained by performing operating system calls. The particular calls as well as their availability is in accordance with each of the systems as well as the means provided to obtain system configuration information.

At step 100, corresponding database records are created and stored on a data storage device. In this particular embodiment, the database records are created in accordance with an object database for example as represented by the model 71, and stored for example, on a data storage device such as 22 a FIG. 4. Routines to create and store database records may be supplied by the commercially available database package in accordance with each particular embodiment and implementation. The storing of the foregoing information may result in the creation of additional database objects in this embodiment, such as the session and project objects, in conjunction with the module and system configuration objects, to result in a database organization in accordance with the previously described schema.

Figure 11:
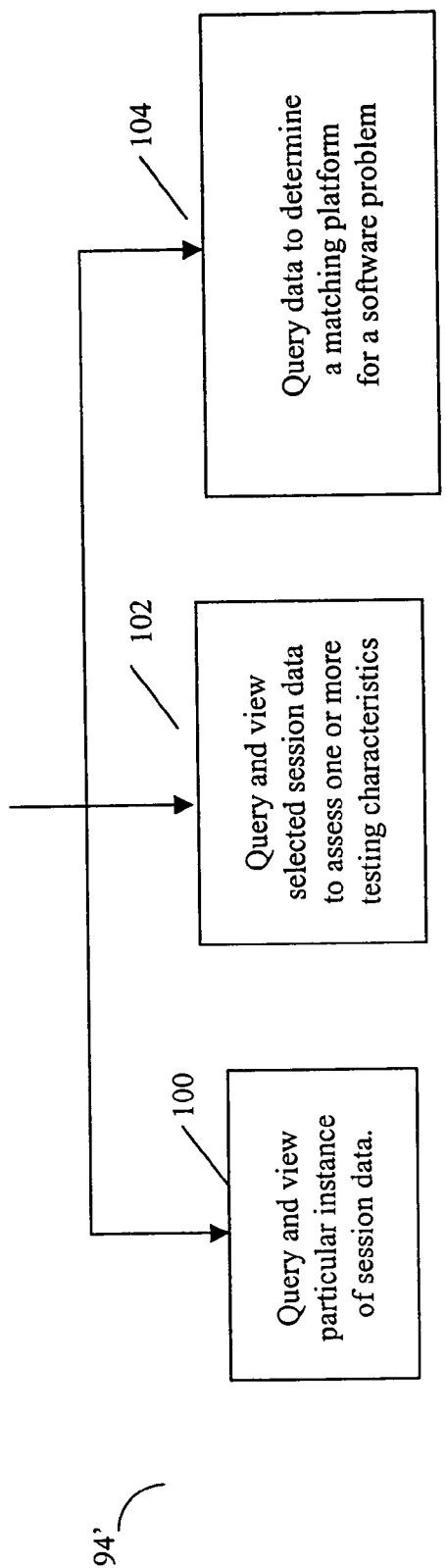
FIG. 11 is an example of an embodiment of the different types of data operations that may be performed with regard to recorded session data in the database.

Referring to FIG. 11, shown is an example of an embodiment of a flowchart that includes several options of how the database may be interrogated with regard to recorded platform data corresponding to a session. Generally, 94' is a flowchart representing 3 different functions described in steps 100, 102 and 104 setting forth in more detail processing steps associated with previously describes step 94 of flowchart 90. The user may interact with the database to perform any of these functions 100, 102, 104 in this particular embodiment. Additionally, the functionality associated with each of these steps as will be described may be embodied in one or more software tools that may be provided in conjunction with the database product as well as sold with a commercially available implementation of the monitor process 30. These software tools may be a machine executable program produced, as by compiling and linking for example, using a conventional, commercially available programming language, such as C or C++. These software tools are executable by a computer processor, such as the computer processor 20 previously described in conjunction with FIG. 1.

The user may select an option of 100, 102 or 104 to perform a function regarding the database. At step 100, a user may select to query and view a particular instance of session data. For example, a developer may wish to see which platform data gathered with regard to a particular test run on a particular day. Using database interface and function calls, for example, as may be provided in accordance with the commercially available object database Poet, a software tool may implement step 100 by interacting with the database using various database calls and a query language as provided in accordance with each particular implementation.

At step 102, a user may choose to query and view selected session data which may involve multiple sessions in order to assess testing coverage. For example, using database query language interfaces, a developer may desire to have a complete list of all of the various platforms including hardware and software configuration and component information tested with regard to a particular project. This may be performed, for example, using set union operations, or their equivalent operations, on the various data stored in the session, module, and system configuration objects of the database. Using the links and connections previously described between each of the objects, a query may be made of the database, for example using set union operations, to produce such a query result and display it to the user for example using a tool. More detailed steps regarding processing related to this step in one embodiment is discussed in paragraphs that follow.

A user may also select at step 104 to query the database to determine a matching platform for a particular software problem. Additional detail regarding processing in one embodiment related to this step is discussed in paragraphs that follow.

It should be noted that the monitor process 30, in addition to performing routine calls to obtain various system configuration information, may also perform system calls as provided in accordance with operating system functionality for additional software information besides that which may be supplied by the processes described in conjunction with FIGS. 2 and 3.

In the embodiment previously described in conjunction with FIG. 3, a portion of module information, such as the name of a loaded DLL, may be obtained from the debug event reporting code. Additional module information may be obtained, for example, by using the module name as an input parameter to an operating system API which returns the additional module information. In the embodiment previously described in conjunction with FIG. 2, the monitor proxy DLL may obtain a DLL handle, for example, as a return API value from a routine that loads the DLL. The Monitor Proxy DLL 42 may further use this DLL handle to obtain additional module or DLL information, for example, using values returned from operating system routines or APIs. Other embodiments may obtain portions of the system configuration data and software module information using techniques such as these or others in accordance with the type of data being obtained and the function provided in each embodiment, for example by a particular operating system.

What will now be described in conjunction with FIGS. 12–16 are processing steps that may be associated with step 102 of flowchart 94'. Generally, described are various techniques and operations that may be performed with regard to data included in the previously described database, for example, to assess one or more testing characteristics. An embodiment, for example, may include one or more of these techniques by presenting the user with a menu selection to perform the various associated operations.

Figure 12:
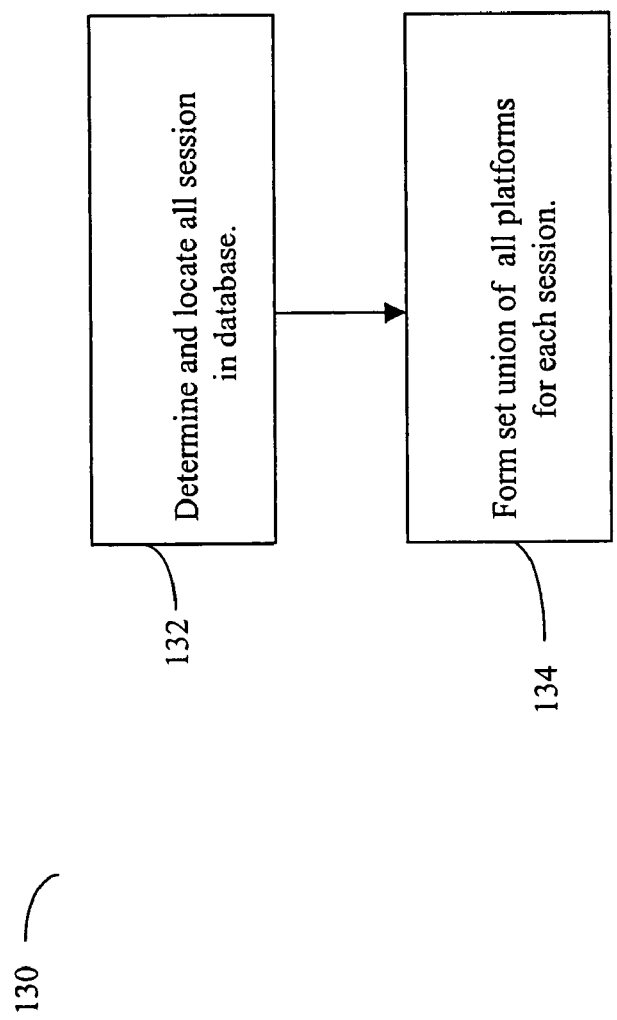
FIGS. 12–16 are examples of embodiments of flowcharts associated with processing operations upon data recorded in the database to assess one or more testing characteristics.

Referring to FIG. 12, shown is a flowchart of method steps of one embodiment associated with performing step 102. The flowchart 130 generally sets forth steps for determining the various platforms tested. At step 132, all session objects in the database are determined and located. This step may be performed using the foregoing object oriented database. As previously described, this and other steps making an inquiry of the database may be performed using database queries, as by an API provided in conjunction with the database or other technique in accordance with each implementation.

At step 134, a set union operation is performed over the session objects from step 132 to form a resulting set union of all platforms. This resulting set union represents the set of all uniquely occurring platforms amongst the sessions.

Figure 13:
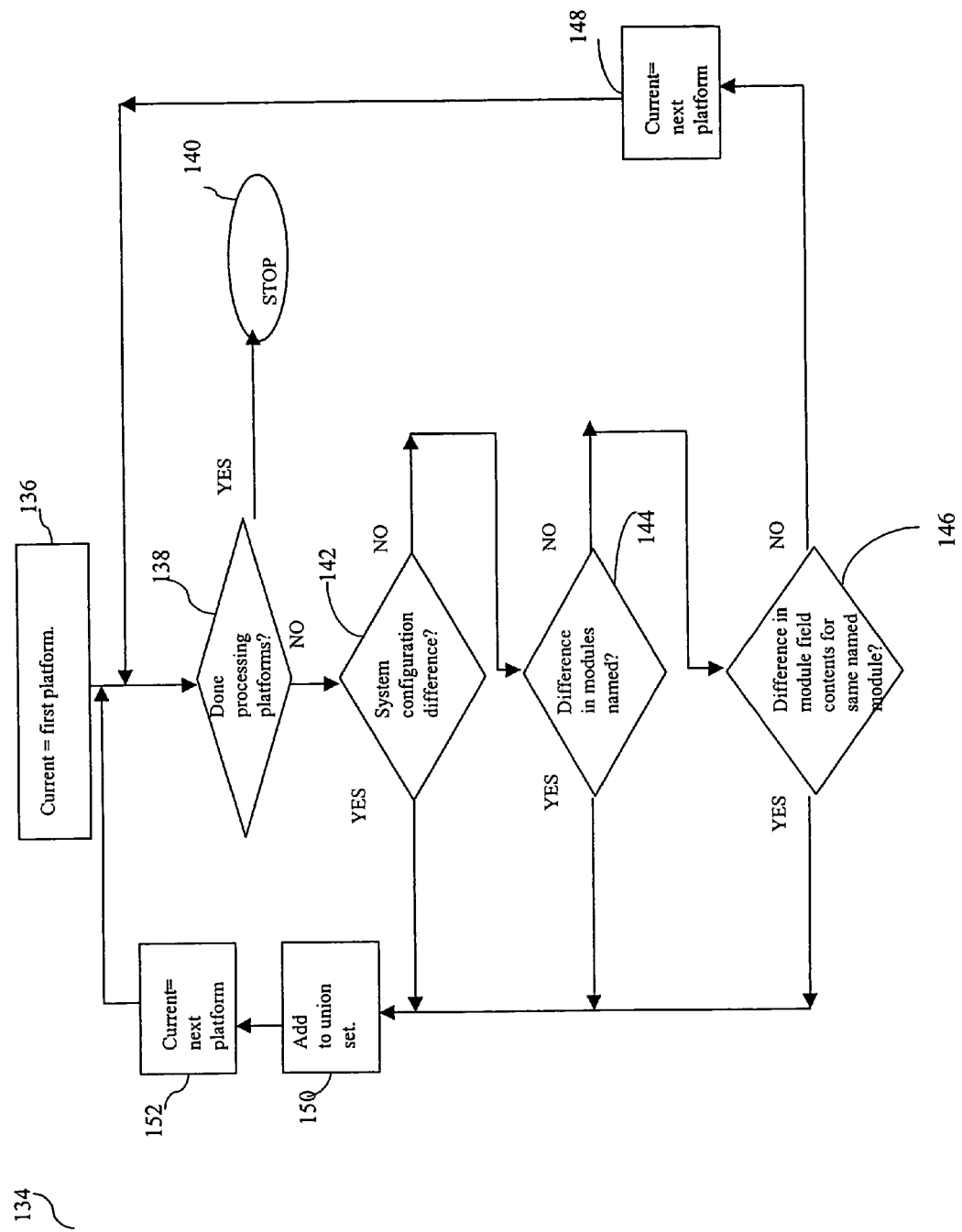

Referring to FIG. 13, shown is a flowchart of an embodiment of a method for performing step 134 to form the set of all unique platforms. Generally, the processing of flowchart 134 iterates through each platform associated with each session and compares the various hardware and software information.

At step 136, "current", indicating the current platform being processed, is assigned the first platform associated with one of the session objects. At step 138, a test is performed to determine whether the processing of platforms is complete. If a determination is made that processing is complete, that is there are no remaining sessions having a platform to be examined, control proceeds to step 140 where processing of flowchart 134 stops.

If a determination is made at step 138 that processing of platforms is not complete, control proceeds to step 142 where a determination is made as to whether there is a system configuration difference. This difference may be determined, for example, by comparing the various field values or attributes of the current platform to those of the platforms already included in the resulting union set of all unique platforms. If there is a difference in system configuration control proceeds to step 150 where the current platform is added to the resulting union set, and the next platform is examined by making it the current platform, as in step 152.

If a determination at step 142 indicates that there is no system difference between the current platform and those platforms included in the resulting union set thus far, control proceeds to step 144 where a determination is made as to whether there is a difference in the modules named for the current platform and those named in each of the platforms included in the resulting union set. If at step 144 a determination is made that there is a difference in the named modules, control proceeds to step 150 where the current platform is added to the resulting union set. If at step 144 a determination is made that there is no difference in the named modules, control proceeds to step 146 where the various attributes or field contents associated with each module are further examined.

A determination is made at step 146 as to whether, for each named module, the attributes or values of each field of the current platform match those of the corresponding named module for each platform in the resulting union set. If a determination is made that there is a difference, the current platform is added to the resulting union set at step 150. If a determination is made that there is no difference in attributes for each corresponding module, control proceeds to step 148 where the next platform becomes the current platform for examination upon the next loop iteration.

Figure 14:
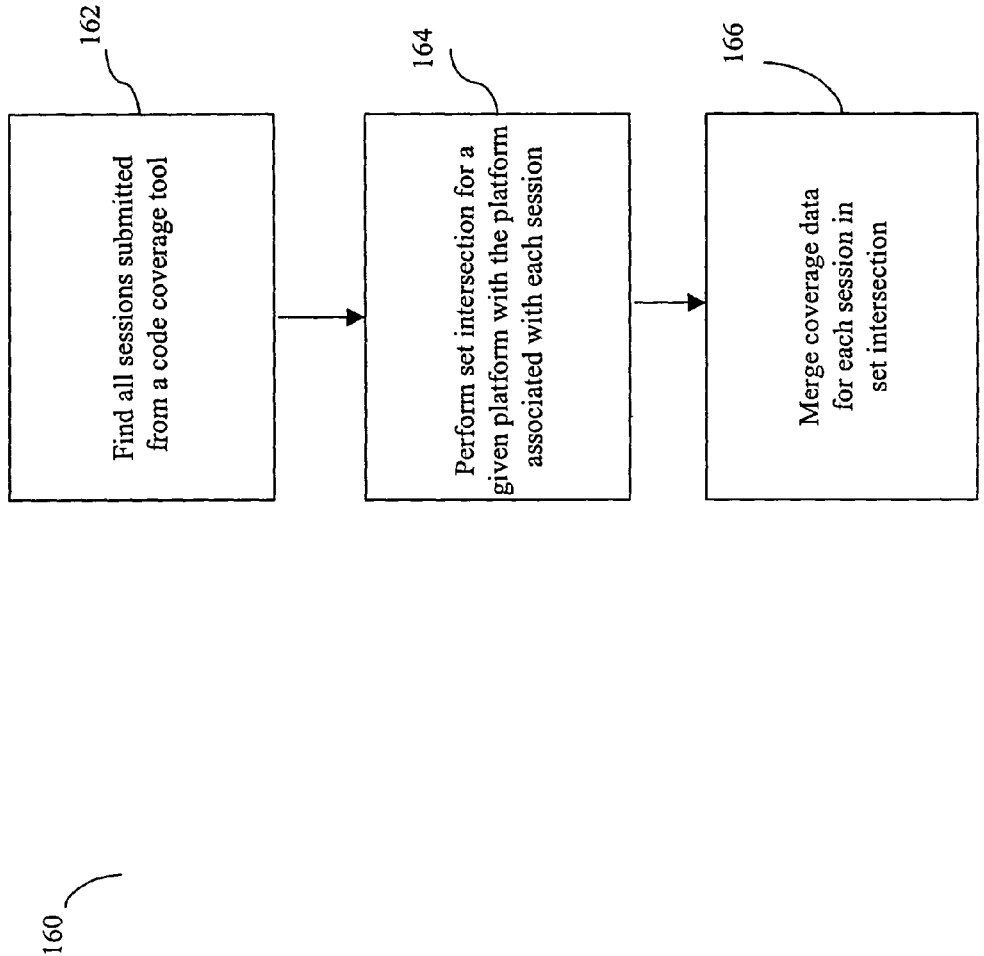

Referring to FIG. 14, shown is a flowchart of an example of a method that may also be performed in an embodiment associated with step 102 processing. Generally, the flowchart 160 describes a technique for determining the amount of testing for a given platform. At step 162, all sessions in the database submitted from a code coverage tool, such as TrueCoverage, are determined. A query is performed of the database to determine which sessions have corresponding testing information previously obtained by another software tool that determines, in this example, the amount of code tested in a particular session.

In one embodiment, this testing coverage information may be associated with the previously described session object, for example, by having a pointer field included in the session object identifying a testing coverage data file. The testing coverage data file may be created, for example, by a code coverage tool. The testing coverage data file may be stored in the database and retrieved, for example, using database query and retrieval techniques previously described. Other embodiments may have other data storage and retrieval techniques and arrangements for testing coverage data, or other data, associated with a session.

At step 164, a set intersection operation is performed between a given platform and the platforms associated with each session from step 162. At step 166, the resulting set intersection represents the sessions associated with a given or predetermined platform. Merging the coverage data associated with each session of the resulting set intersection represents the amount of testing performed for the predetermined platform. This data merging, for example, may be performed using function provided by the code coverage tool. Other techniques may used to merge the data in accordance with each implementation.

Figure 15:
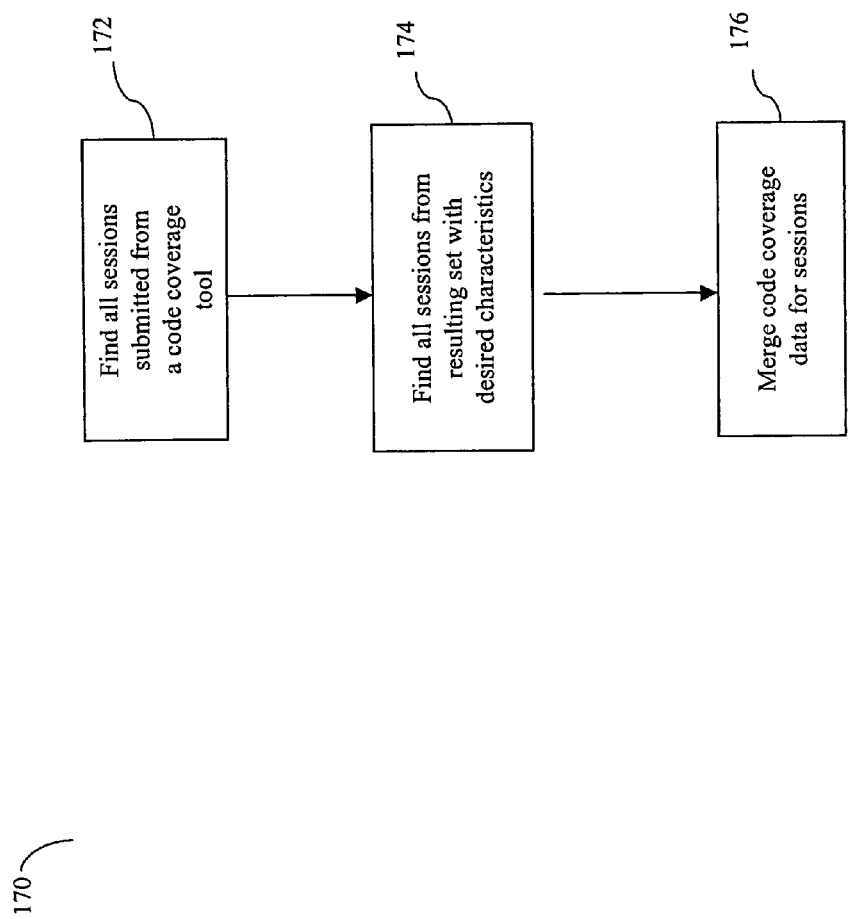

Referring to FIG. 15, shown is a flowchart of an example of method steps of another embodiment associated with the processing of step 102. Generally, the flowchart 170 describes how to determine test coverage data to be merged in accordance with predetermined criteria, such as in accordance with a particular platform. Flowchart 170 may be viewed as a generalization of the steps of flowchart 160. At step 172, all sessions associated with code coverage information, as may be produced with a code coverage tool, are determined. At step 174, predetermined criteria or characteristics are determined. The resulting set is formed by determining all sessions with the predetermined criteria. This may include, for example, determining which sessions are used to test a particular operating system thereby reporting on code coverage by operating system, or reporting on testing coverage associated with multi-processor machines. Similarly as described in processing associated with step 164 of flowchart 160, the set intersection operation may be used to locate these sessions by performing a database query in accordance with the predetermined criteria. At step 176, the code coverage data is merged for the sessions identified as a result of step 174. This merging may be performed, for example, as also previously described with regard to step 166 of flowchart 160.

Figure 16:
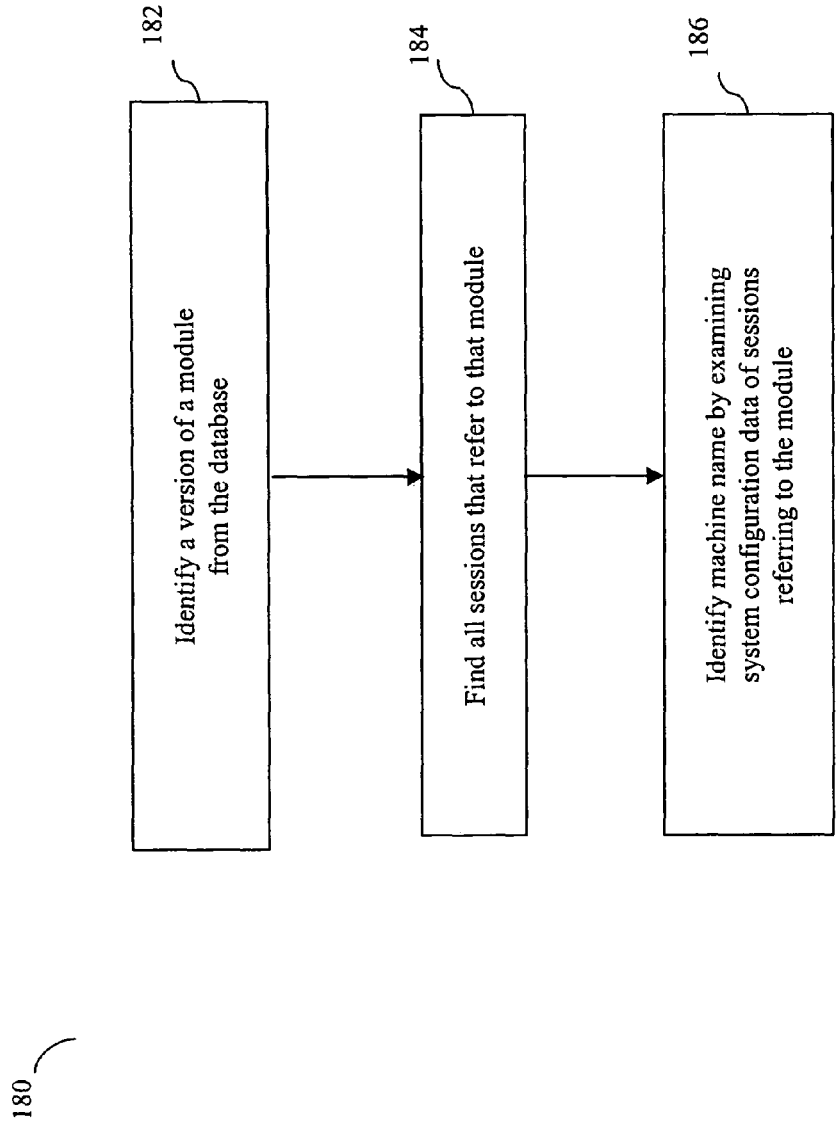

Referring to FIG. 16, shown is a flowchart of another embodiment of a method that may be associated with step 102 processing steps. Generally, the flowchart 180 uses historical platform data to find a machine with certain attributes. For example, if a bug is reported, as using the e-mail reader tool 162, that included using a version of a DLL, such as the COMCTL32.DLL, different than the version currently present on a developer's system, a developer may use the technique of flowchart 180 to locate another machine using stored platform data that may have the library version as included in the bug report. At step 182, a database query is performed to locate the version of the DLL as included in the bug report. This may be accomplished, for example, performing a database query of the module objects in accordance with particular attributes, or field values, that identify the particular version. At step 184, all sessions that refer to this module are determined. This may also be performed using a database query, for example, using the pointers, such as 75c, from the module to the referencing sessions. This information may be returned as the result of a database query or other operation in accordance with each embodiment. At step 186, a machine name may be identified by retrieving and examining the system configuration information of sessions referring to this module.

Figure 17:
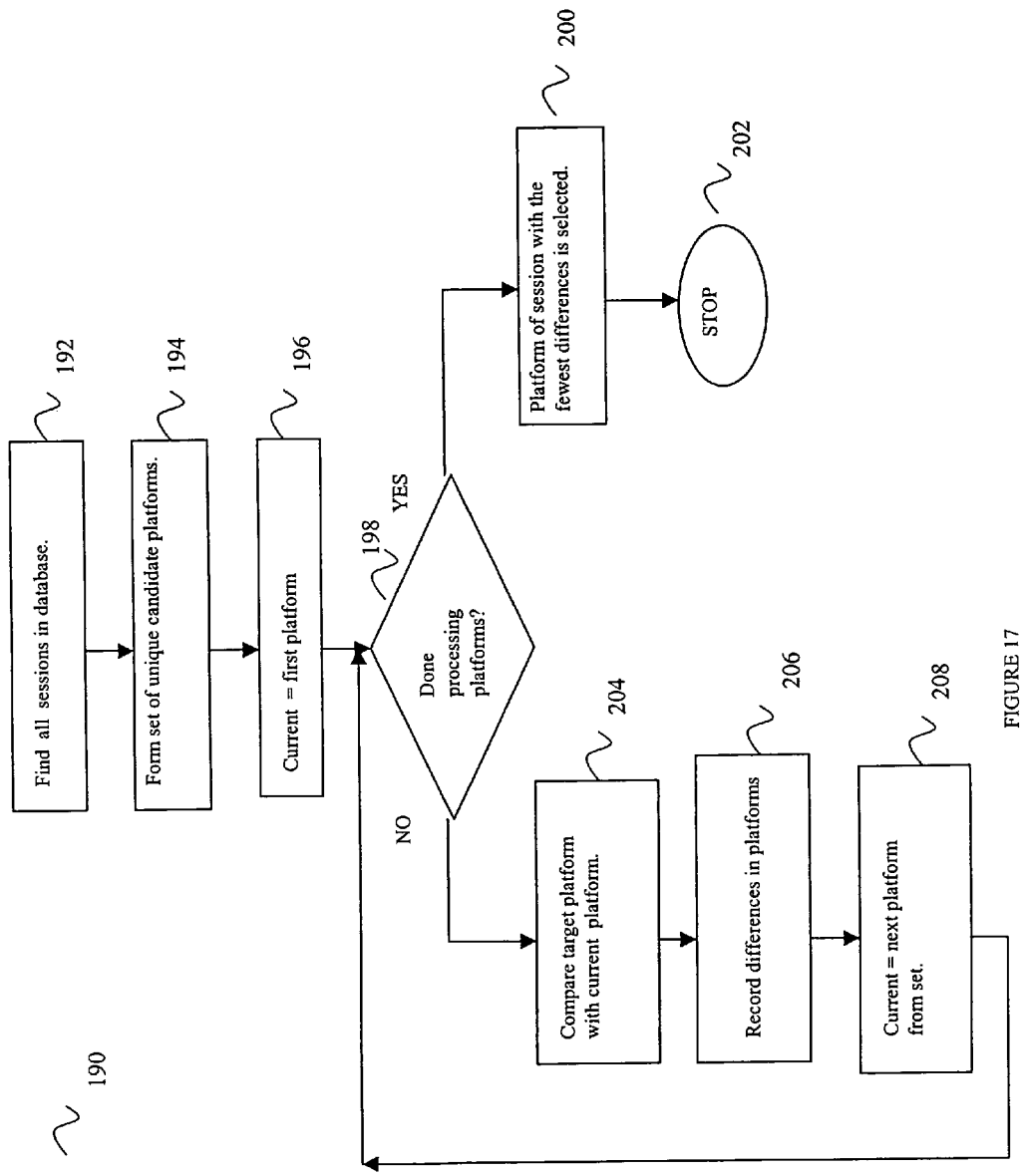
FIGS. 17–18 are examples of embodiments of flowcharts associated with processing operations to determine a matching platform in accordance with a target platform in an embodiment.
Figure 18:
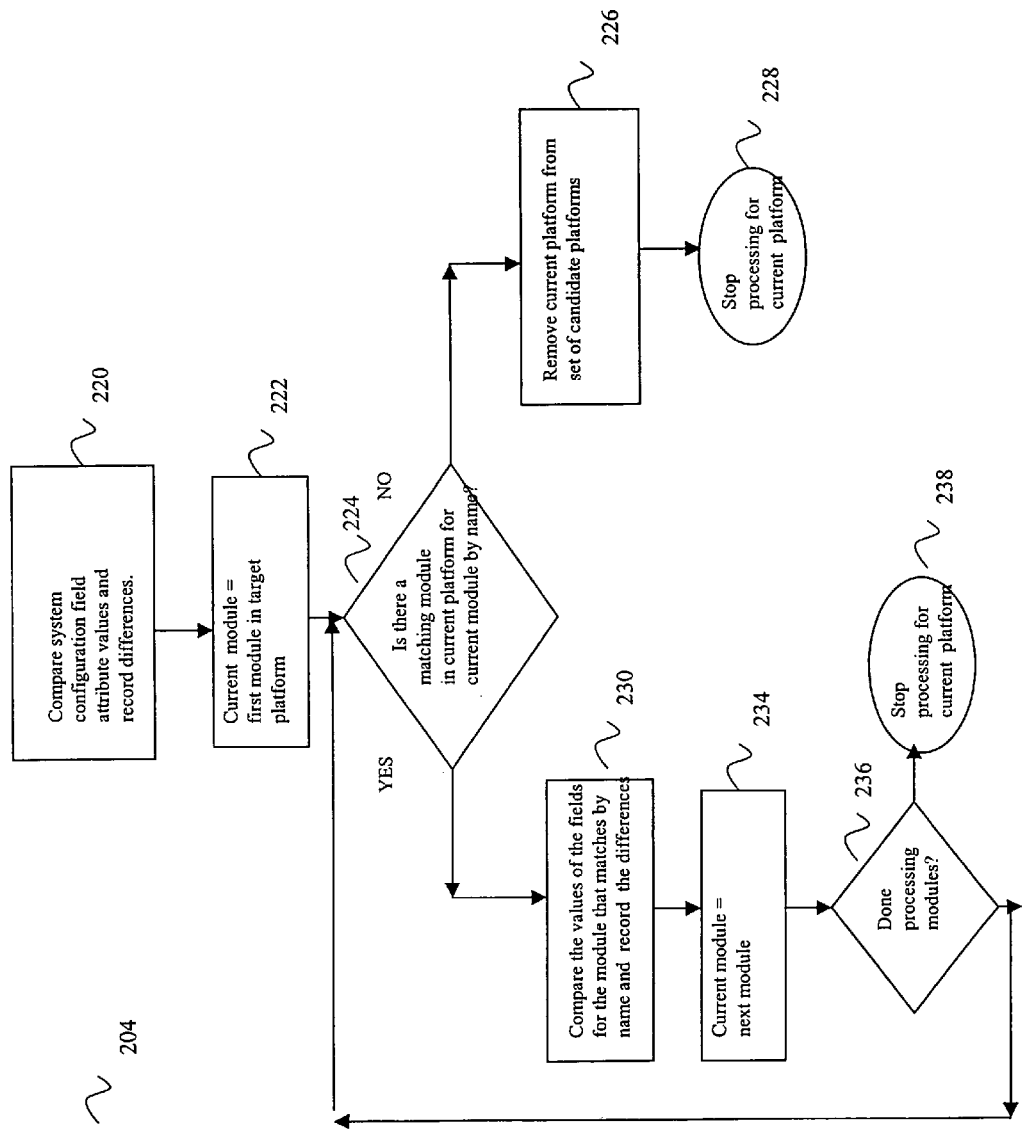

What will now be described in conjunction with FIGS. 17 and 18 are techniques that may be performed in conjunction with processing of step 104 to determine a matching platform for a software problem in one embodiment.

Referring to FIG. 17, shown is a flowchart of an example of a method that may be performed with the processing step 104 of flowchart 94'. Generally the flowchart 190 describes a technique for determining a matching platform in accordance with, for example, a platform coinciding with reproducing a bug as submitted in a bug report. For example, a developer may locate which machine has the platform closest to that of a submitted bug report in order to enable the developer to attempt to reproduce the bug. At step 192, all sessions in the database are determined. At step 194, a set of unique candidate platforms is determined. This may be done, for example, by performing the previously described set union operation with regard to platforms associated with the sessions obtained in step 192. At step 196, the first platform becomes the current platform being examined and compared to the target platform for which a search is being performed.

At step 198, a determination is made as to whether the processing of platforms is complete. In other words, have all platforms been examined. If a determination is made at step 198 that processing of all platforms is complete, control proceeds to step 200 where the platform or platforms having the fewest differences, if any, with regard to the target platform is selected. At step 202, processing of flowchart 190 stops.

If a determination is made at step 198 that the processing is not complete with respect to examining and comparing all platforms, control proceeds to step 204 where a comparison is made between the target platform and the current platform. Additional detail regarding processing of step 204 is discussed in paragraphs that follow. At step 206, any differences between the target platform and the current platform are recorded. These differences may be recorded in any one of a variety of data structures or other forms to be used in later processing, for example, of step 200. For example, one embodiment may include a data structure having a first field that is an integer quantity representing the count or number of differences determined. The data structure may also include a second field that is a pointer to the one or more objects representing the best platform match determined thus far. At step 208, the next platform becomes the current platform which is examined in the next loop iteration.

Referring to FIG. 18, shown is a flowchart of more detailed processing steps of step 204 of an embodiment for comparing the target and current platforms. At step 220, the system configuration field attribute values of the target platform and the current platform are compared and then recorded. In following steps, a loop iteration is described which iterates over all modules associated with the current platform.

At step 222, the current module is set to the first module associated with the current platform. A determination is made at step 224 as to whether there is a matching module in the current platform corresponding to the current module by name. If a determination is made that there is no matching module, control proceeds to step 226 where the current platform is removed from the set of candidate platforms formed at step 194. Control proceeds to step 228 wherein processing for the current platform stops.

If a determination is made at step 224 that there is a matching module name in the current platform and the target platform, control proceeds to step 230 where a comparison is made of the attributes or database fields associated with each matching module name. The differences between these fields, if any, are recorded. At step 234, the next module becomes the current module for processing in the next loop iteration. At step 236, a determination is made as to whether the processing of modules for the current platform is complete. If a determination is made that the module processing is complete, control proceeds to step 238 where processing for the current platform stops. Otherwise, if module processing is not complete as determined at step 236, control proceeds to step 224 to the next loop iteration.

It should be noted that in the foregoing descriptions, various operations, such as set union and intersection operations, are set forth to describe a more general technique. The actual operations, such as set union or intersection, used in each implementation may vary in accordance with each implementation. Those of ordinary skill in the art are able to determine comparable operations in accordance with the function provided by each implementation.

The number of the foregoing methods and techniques that may be included in an embodiment vary with each implementation. They may be included and used in various combinations to perform different assessments with regard to the database. For example, the methods and techniques of FIGS. 13 and 14 may be used in combination to first determine all platforms and then determine the amount of testing coverage for each platform. Alternatively, an embodiment may also separately provide the functions associated with FIGS. 13 and 14 rather than use them in combination.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for automatically tracking hardware and software platform usage for a plurality of program executions on a plurality of hardware and software platforms comprising:
   enabling collection of one or more records of hardware and software platform information prior to execution of each of said plurality of programs;
   executing each of said plurality of programs;
   recording, in a central data storage device in response to said enabling, one or more records of hardware and software platform information and one or more records of code coverage information for said plurality of program executions; and
   assessing, in accordance with at least one predetermined criteria, code coverage associated with at least one of hardware and software platform usage using said one or more records of hardware and software platform information from said plurality of program executions.

2. The method of claim 1, wherein each of said one or more records of hardware and software platform information includes software component data and system configuration data.

3. The method of claim 2, wherein said system configuration data includes hardware data and software settings describing an environment of a computer system in which a program is executed.

4. The method of claim 2, wherein at least a first portion of the software component data corresponds to a software component that is a shared library.

5. The method of claim 4, wherein the shared library is one of a dynamic link library and a control library.

6. The method of claim 2, wherein the system configuration information includes data describing at least one of: a number of processors in a particular platform, a system name, an indicator as to a hardware processor type, an operating system identifier, an amount of physical memory, and an identifier for each program execution associated with said system configuration information being described.

7. The method of claim 2, wherein a plurality of hardware and software platforms are associated with said plurality of program executions, and the method further including:
   recording, for each of said plurality of hardware and software platforms, software component data associated with each software component included in said each hardware and software platform, said software component data includes information uniquely identifying said each software component.

8. The method of claim 7, wherein said software component data includes at least one of a module name, a link date, a file version, a file size, and a product version.

9. The method of claim 7, wherein said software component information includes data indicating one or more of said plurality of program executions that are associated with a first software component corresponding to said software component information.

10. The method of claim 1, further including performing one or more routine calls using a function provided by an operating system to gather a portion of at least one of the records of hardware and software platform information.

11. The method of claim 1, further comprising:
    obtaining software component data using an event reporting mechanism that reports information to a monitor process.

12. The method of claim 1, further including:
    linking a program to be tested to include monitoring; and
    reporting software component data at runtime to a monitor process by monitoring predetermined calls made from a portion of a program being executed.

13. The method of claim 12, wherein the calls being monitored are in user supplied code.

14. The method of claim 13, wherein the program being executed includes a software component directly invoked from a portion of user supplied code.

15. The method of claim 13, wherein the program being executed includes at least one software component that is not directly invoked from a portion of user supplied code.

16. The method of claim 1, further including:
   forming a set union of said one or more records of hardware and software platform information to identify each unique platform.

17. The method of claim 16, wherein each of said one or more records of hardware and software platform information includes software component data and system configuration data, and the method further includes:
   forming an initial union set that includes a first record of hardware and software platform information;
   determining for a second record of hardware and software platform information if there are differences in system configuration data associated with said first and second records of hardware and software platform information;
   determining for said second record of hardware and software platform information if there are differences in software component data associated with said first and second records of hardware and software platform information; and
   adding said second record of hardware and software platform information to said initial union set if any differences are determined in system configuration data or software component data.

18. The method of claim 17, wherein determining differences in software component data includes:
   determining differences in named software modules associated with said first and second records of hardware and software platform information; and
   determining differences in attributes of a first named software module included in said first and said second records of hardware and software platform information.

19. A computer program product for automatically tracking hardware and software platform usage for a plurality of program executions on a plurality of, hardware and software platforms comprising:
   machine executable code for enabling collection of one or more records of hardware and software platform information prior to execution of each of said plurality of programs;
   machine executable code for executing each of said plurality of programs;
   machine executable code for recording, in a central data storage device in response to said machine executable code for enabling, one or more records of hardware and software platform information and one or more records of code coverage information for a said plurality of program executions; and
   machine executable code for assessing, in accordance with at least one predetermined criteria, code coverage associated with at least one of hardware and software platform usage using said one or more records of hardware and software platform information from said plurality of program executions.

20. The computer program product of claim 19, wherein each of said one or more records of hardware and software platform information includes software component data and system configuration data.

21. The computer program product of claim 20, wherein said system configuration data includes hardware data and software settings describing an environment of a computer system in which a program is executed.

22. The computer program product of claim 20, wherein at least a first portion of the software component data corresponds to a software component that is a shared library.

23. The computer program product of claim 22, wherein the shared library is one of a dynamic link library and a control library.

24. The computer program product of claim 20, wherein said system configuration information includes data describing at least one of: a number of processors in a particular platform, a system name, an indicator as to a hardware processor type, an operating system identifier, an amount of physical memory, and an identifier for each program execution associated with said system configuration information being described.

25. The computer program product of claim 20, wherein a plurality of hardware and software platforms are associated with said plurality of executions, and the computer program product further including:
   machine executable code for recording, for each of said plurality of hardware and software platforms, software component data associated with each software component included in said each hardware and software platform, said software component data includes information uniquely identifying said each software component.

26. The computer program product of claim 25, wherein said software component data includes at least one of a module name, a link date, a file version, and a-product version.

27. The computer program product of claim 25, wherein said software component information includes data indicating one or more of said plurality of program executions that are associated with a first software component corresponding to said software component information.

28. The computer program product of claim 19, further including machine executable code for performing one or more routine calls using a function provided by an operating system to gather a portion of at least one of the records of hardware and software platform information.

29. The computer program product of claim 19 further comprising:
   machine executable code for obtaining software component data using an event reporting mechanism that reports information to a monitor process.

30. The computer program product of claim 19, further including:
   machine executable code for linking a program to be tested to include monitoring; and
   machine executable code for reporting software component data at runtime to a monitor process by monitoring predetermined calls made from a portion of a program being executed.

31. The computer program product of claim 30, wherein the calls being monitored are in user supplied code.

32. The computer program product of claim 31, wherein the program being executed includes a software component directly invoked from a portion of user supplied code.

33. The computer program product of claim 31, wherein the program being executed includes at least one software component that is not directly invoked from a portion of user supplied code.

34. The computer program product of claim 19, further comprising:
   machine executable code for forming a set union of said one or more records of hardware and software platform information to identify each unique platform.

35. The computer program product of claim 34, wherein each of said one or more records of hardware and software platform information includes software component data and system configuration data, and the computer program product further includes:
- machine executable code for forming an initial union set that includes a first record of hardware and software platform information;
- machine executable code for determining for a second record of hardware and software platform information if there are differences in system configuration data associated with said first and second records of hardware and software platform information;
- machine executable code for determining for said second record of hardware and software platform information if there are differences in software component data associated with said first and second records of hardware and software platform information; and
- machine executable code for adding said second record of hardware and software platform information to said initial union set if any differences are determined in system configuration data or software component data.

36. The computer program product of claim 35, wherein said machine executable code for determining differences in software component data includes:
- machine executable code for determining differences in named software modules associated with said first and second records of hardware and software platform information; and
- machine executable code for determining differences in attributes of a first named software module included in said first and second records of hardware and software platform information.

37. A method executed in a computer system for automatically tracking hardware and software platform usage for a plurality of program executions on a plurality of hardware and software platforms comprising:
- enabling collection of one or more records of hardware and software platform information prior to execution of each of said plurality of programs;
- executing each of said plurality of programs;
- recording, in a central data storage device in response to said enabling, one or more records of hardware and software platform information and one or more records of code coverage information for said plurality of program executions; and
- querying said central data storage device, in accordance with at least one predetermined criteria using said one or more records of hardware and software platform information from said plurality of program executions, to determine code coverage associated with at least one of hardware and software platform usage.

* * * * *